United States Patent [19]

Sera et al.

[11] Patent Number: 4,933,840
[45] Date of Patent: Jun. 12, 1990

[54] I/O CONTROL SYSTEM USING BUFFER FULL/EMPTY AND ZERO WORDS SIGNALS TO CONTROL DMA READ/WRITE COMMANDS

[75] Inventors: Akihiro Sera, Tokyo; Kazuhiko Goukon; Yuji Shibata, both of Kawasaki, all of Japan

[73] Assignee: Fujitsu Limited, Kawasaki, Japan

[21] Appl. No.: 281,947

[22] Filed: Dec. 7, 1988

Related U.S. Application Data

[63] Continuation of Ser. No. 865,516, May 21, 1986, abandoned.

[30] Foreign Application Priority Data

May 21, 1985 [JP] Japan ................................ 60-106835
May 22, 1985 [JP] Japan ................................ 60-108337

[51] Int. Cl.$^5$ .......................... G06F 3/00; G06F 9/22; G06F 13/12; G06F 13/28
[52] U.S. Cl. .................. 364/200; 364/238.3; 364/926.1
[58] Field of Search ... 364/200 MS File, 900 MS File

[56] References Cited

U.S. PATENT DOCUMENTS

| | | | |
|---|---|---|---|
| 4,060,849 | 11/1977 | Bienvenu et al. | 364/200 |
| 4,246,637 | 1/1981 | Brown et al. | 364/200 |
| 4,321,665 | 3/1982 | Shen et al. | 364/200 |
| 4,414,626 | 11/1983 | Arai et al. | 364/200 |
| 4,428,044 | 1/1984 | Liron | 364/200 |
| 4,467,454 | 8/1984 | Kurose | 365/189 |
| 4,549,263 | 10/1985 | Calder | 364/200 |
| 4,571,671 | 2/1986 | Burns et al. | 364/200 |

OTHER PUBLICATIONS

IBM Technical Disclosure Bulletin, vol. 24, No. 12, May, 1982, pp. 6400-6403, New York, US; S. R. Firth et al.: "IBM System/370 Channel/Unibus Interface".
Wescon Technical Papers, 30th Oct.-2nd Nov. 1984, pp. 24/6-1-24/6-7, Anaheim, Calif., Los Angeles, US; M. Evans: "Programmable Winchester/Floppy Disk Controller with Dual 10M Byte/Sec DMA Channels".
New Electronics, vol. 16, No. 20, Oct. 1983, pp. 74-77, London, GB; K. Ow-Wing: "Strategy for Diagnostic Design".
Motorola Inc., "8-Bit Microprocessor and Peripheral Data", Series C, ed. (C), 1981.

Primary Examiner—Archie E. Williams, Jr.
Assistant Examiner—Ayni Mohamed
Attorney, Agent, or Firm—Staas & Halsey

[57] ABSTRACT

In an input/output control system: a read/write operation for a control register (REG) under a program mode is achieved by hardware; the system is started or stopped under the control of firmware, and a data transfer in the system is achieved under the control of hardware. Therefore, a high speed data communication is realized, via the system, between a central control unit (CC) and an input/output unit (IO).

23 Claims, 26 Drawing Sheets

Fig. 8A
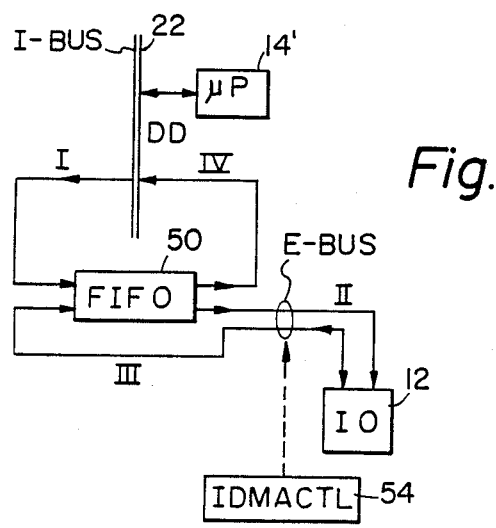
Fig. 8B
Fig. 8C
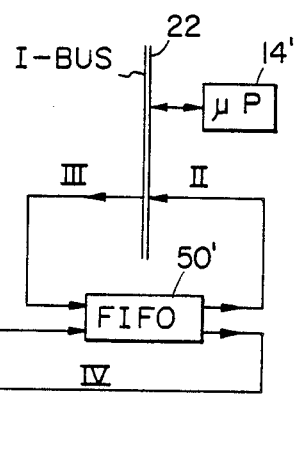

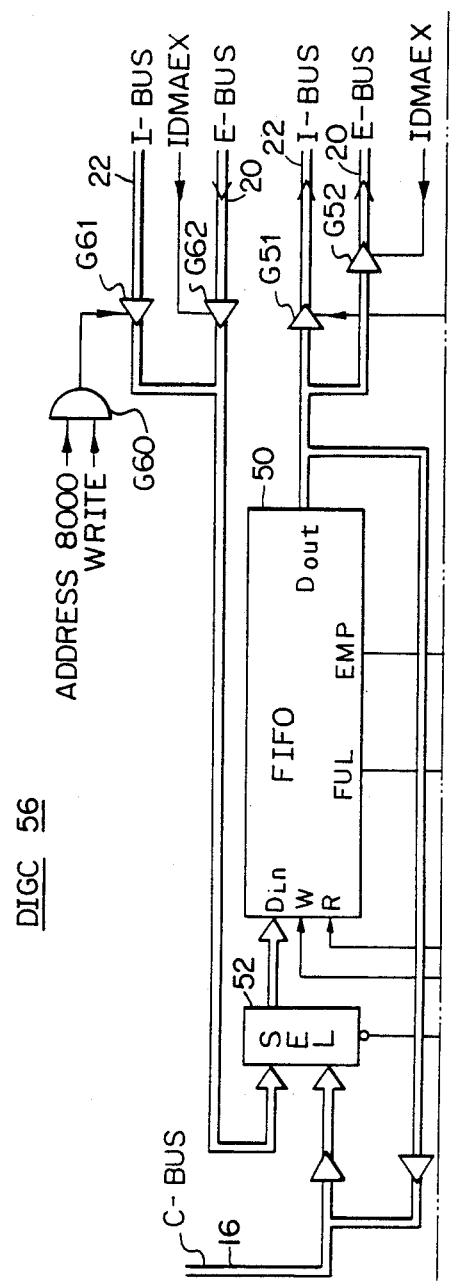

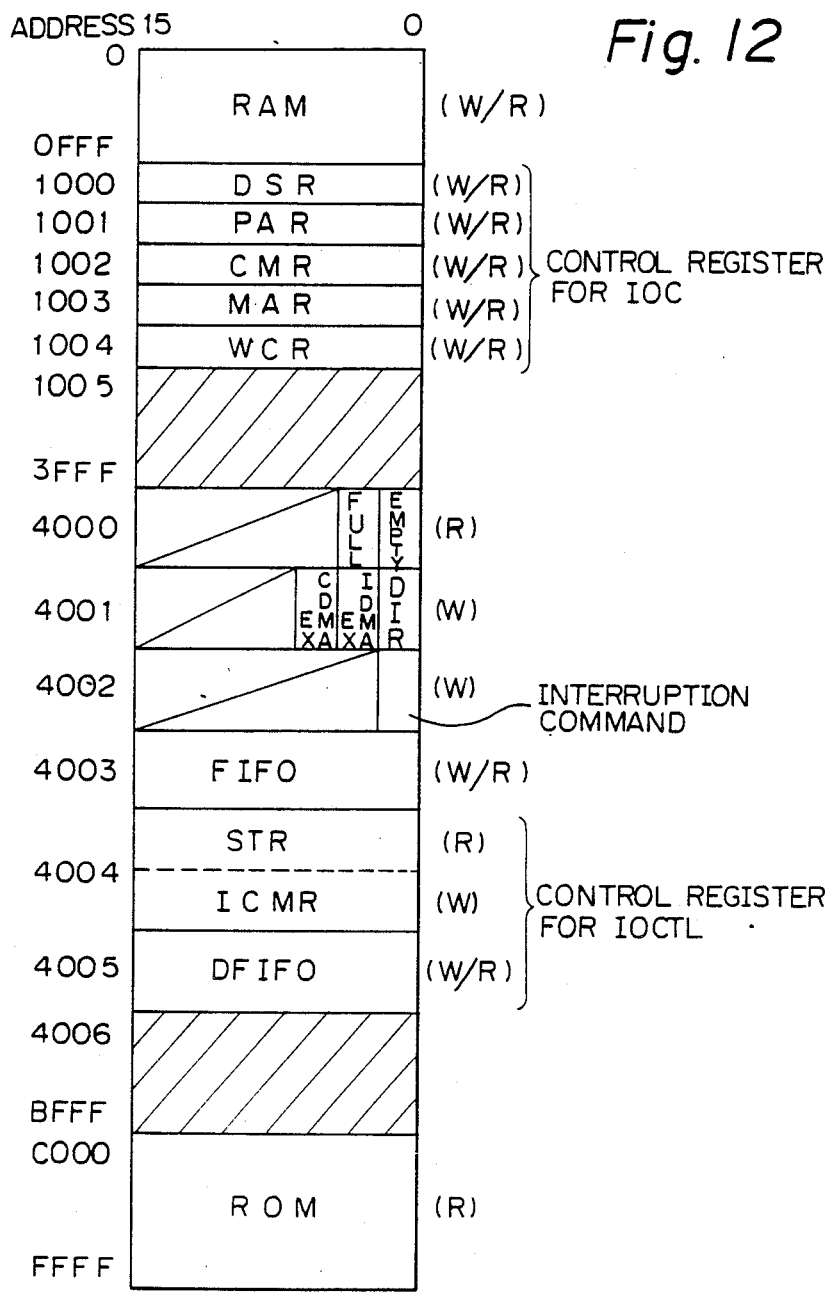

| Fig.16A | Fig.16B |

Fig. 19
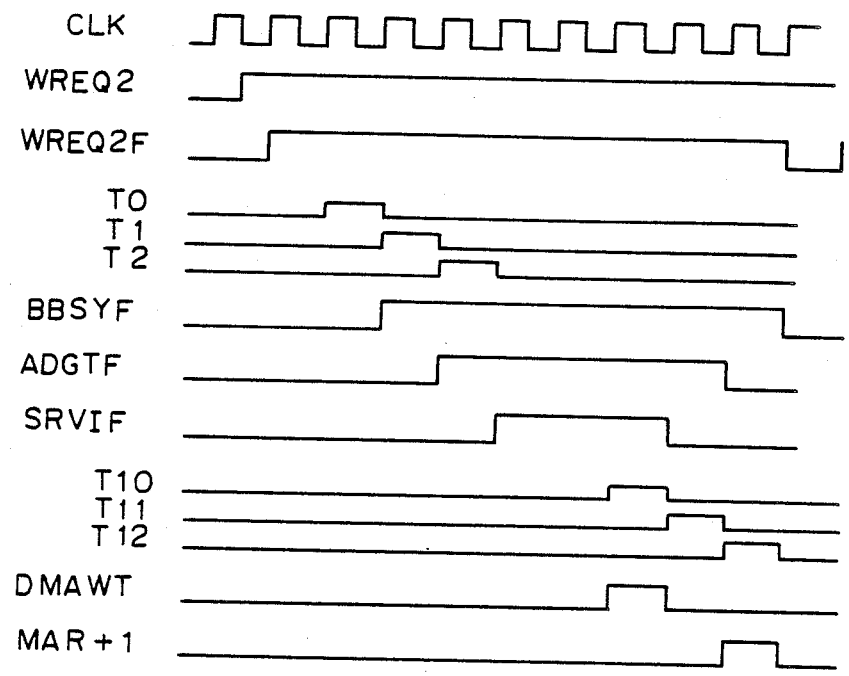
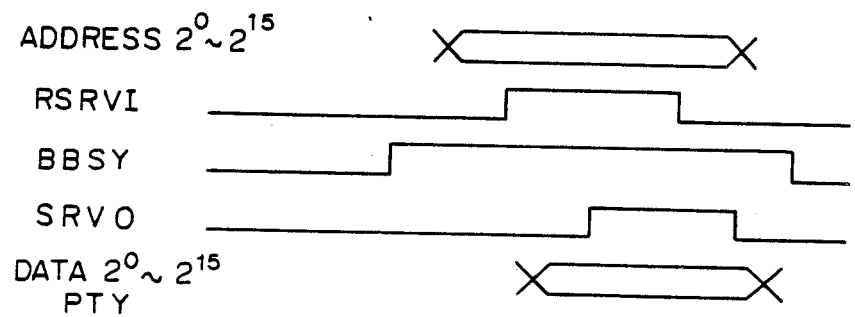

Fig. 20
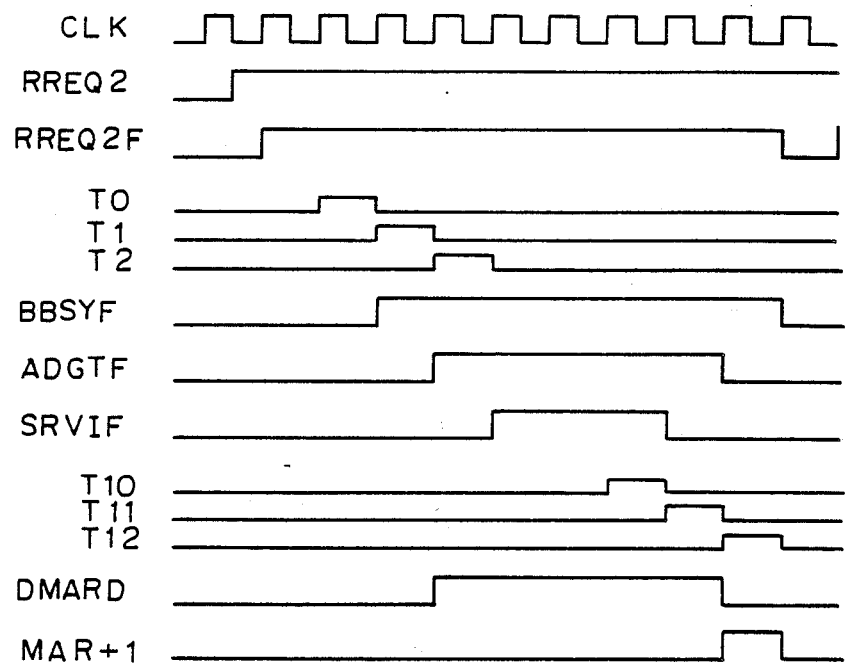
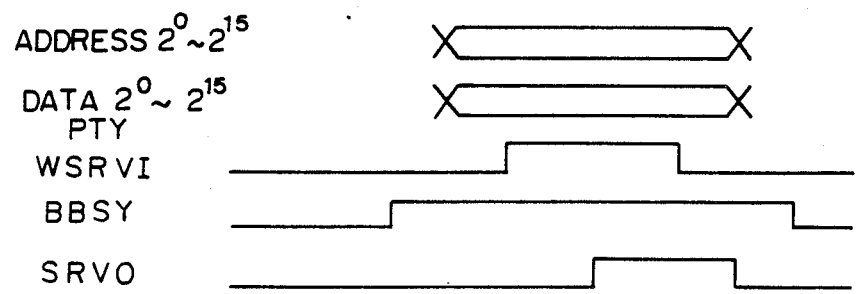

I/O CONTROL SYSTEM USING BUFFER FULL/EMPTY AND ZERO WORDS SIGNALS TO CONTROL DMA READ/WRITE COMMANDS

This is a continuation of co-pending application Ser. No. 865,516 filed on May 21, 1986, now abandoned.

BACKGROUND OF THE INVENTION

1. Field of the Invention

The present invention relates to an input/output control system (herein abbreviated as IOC) which controls transmission of data communicated between a central control unit (below, abbreviated as CC) and an input/output unit (herein abbreviated as IO). More particularly, it relates to an IOC capable of a high operation speed and having a high reliability.

2. Description of the Related Art

The IOC 10 operates to control an IO 12, such as a typewriter, magnetic tape apparatus, magnetic disk apparatus, and so on. Recently, the IO has come under the control of a microprogram. In general, the processors operated by such a microprogram control are classified into two types: (i) a bit-slice processor, and (ii) a one-chip processor The bit-slice processor (i) has a high processing speed, on the order of nanoseconds, and a high processing capability, and thus the bit-slice processor is frequently used for a high speed IOC. In the bit-slice processor, however, a special microprogram is necessary, and therefore, the processor has disadvantages in that it is not beneficial from the viewpoint of a general-purpose applicability in firmware, and that design of relevant hardware and firmware is difficult.

The one-chip processor (ii) does not, however, have the disadvantages inherent to the bit-slice processor (i), and therefore the one-chip processor can be utilized over a wider practical range, compared with the bit-slice processor. The one-chip processor does, however, have a disadvantage in that the processing speed, on the order of nanoseconds, of the one-chip processor is lower than that of the bit-slice processor. The IOC to which the present invention is adapted is controlled with the one-chip processor.

The prior art IOC has two major features, as explained hereinafter. First, a direct memory access (so called DMA) transfer is realized by a microprogram, and second, an interruption to a microprocessor (μP) 14 takes place every time a program mode (PM) operation is initiated during a DMA transfer.

In view of the above-mentioned two features, two problems arise in the prior art IOC. First, a data transmission rate is lowered, and accordingly, a high speed IOC cannot be expected, and second, the related firmware is very complicated. An example of such a prior art IOC is shown in U.S. Pat. No. 4,467,454.

SUMMARY OF THE INVENTION

Accordingly, an object of the present invention is to provide an IOC having a higher operation speed and simpler firmware relative to the aforementioned prior art IOC.

To attain the above object, the IOC, which is connected, via a common bus, with a central control unit (CC), and further connected, via an external-bus, with an I/O so that the IOC performs a transfer of data to be communicated between the CC and the I/O, employs, first, a buffer memory for momentarily storing therein the transfer data and reading the same therefrom, second, a control register for writing therein data transfer control information sent from the CC, and third, a direct memory access control means for reading the data transfer control information from the control register and then achieving, by means of the buffer memory, the data transfer control. The data transfer is carried out by accessing an address specifying a desired I/O, wherein the overall data transfer in the IOC is controlled by a microprocessor mounted therein, which executes a microprogram to start and stop the data transfer.

BRIEF DESCRIPTION OF THE DRAWINGS

The above objects and features of the present invention will be more apparent from the following description of the preferred embodiments with reference to the accompanying drawings, wherein:

FIG. 8A illustrates a schematic general view for explaining the diagnostic check with respect to the memory FIFO;

FIG. 8B illustrates a schematic general view for explaining the diagnostic check with respect to both the memory FIFO and the unit IO;

FIG. 8C illustrates a schematic general view for explaining the diagnostic check with respect to both the memory FIFO and the common bus C-BUS;

FIGS. 10A and 10B illustrate an example of a detailed circuit diagram of the diagnostic check part (DIGC) cooperating with the memory (FIFO);

FIG. 12 shows an address map defined in the input/output control system (IOC);

FIG. 19 depicts timing charts for explaining the operation of the circuit DMACTL under the DMA write mode, i.e., C-BUS→DKU;

FIG. 20 depicts timing charts for explaining the operation of the circuit DMACTL under the DMA read mode, i.e., DKU→C-BUS;

DESCRIPTION OF THE PREFERRED EMBODIMENTS

Before describing the embodiments of the present invention, the related art and the disadvantages therein will be described with reference to the related figures.

Figure 1:
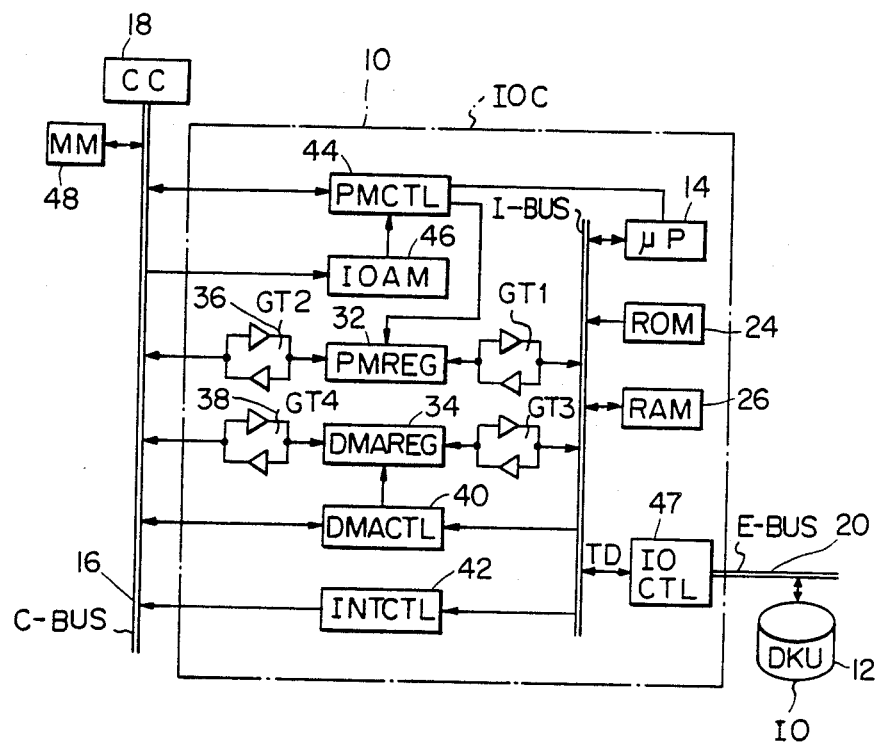
FIG. 1 illustrates a conventional input/output control system with a one-chip microprocessor.

FIG. 1 illustrates a conventional input/output control system having a one-chip microprocessor. In FIG. 1, IOC represents an input/output control system. The IOC is connected, via a common bus C-BUS 16, with a central control unit CC 18, and is also connected, via an external bus E-BUS 20, with an input/output unit IO.

A variety of IO's may exist in a computer system. A magnetic disk unit (DKU) is illustrated as an example, but the input/output unit IO may be a typewriter, a cathode ray tube (CRT) display, or the like.

A nucleus of the IOC is the one-chip microprocessor $\mu P$ which, via an internal bus I-BUS 30, receives data from a read only memory (ROM) 24 and a random access memory (RAM) 26, and via the I-BUS, also sends data to the RAM. Further, the $\mu P$ is connected via gates GT1 28 and GT3 30, which may be, for example, open-collector type gates, with a program mode control register PMREG 32 and a direct memory access mode data register DMAREG 34, respectively. These two registers PMREG and DMAREG are further connected with the common bus C-BUS, via gates GT2 36, and GT4 38, respectively. Furthermore, the microprocessor $\mu P$ is connected with a direct memory access mode control circuit (DMACTL) 40 and an interruption control circuit (INTCTL) 42. The DMACTL and INTCTL circuits, a program mode control circuit (PMCTL) 44, and an input/output address matching circuit (IOAM) 46 are connected with the common bus C-BUS. The I-BUS and E-BUS are interconnected via an input/output unit control circuit IOCTL.

It should be understood that the central control unit CC is usually connected, via the common bus C-BUS, with a plurality of IOC's. However, in FIG. 1, only one IOC, connected with the magnetic disk unit DKU, is representatively displayed. The elements in each IOC play the following roles.

(a) The input/output address matching circuit IOAM determines whether or not the data, transferred on the common bus C-BUS, has an address which specifies its IOC, so that the circuit IOAM can selectively recognize its IOC from among a plurality of IOC's.

(b) The program mode control circuit PMCTL performs a data transfer under a program mode executed by the central control unit CC.

(c) The program mode control register PMREG acts as a buffer for a data transfer under the program mode.

(d) The direct memory access mode data register DMAREG acts as a buffer for a data transfer under the DMA mode.

(e) The direct memory access mode control circuit DMACTL achieves a data transfer under the DMA mode.

(f) The interruption control circuit INTCTL controls the interruption operation.

(g) The input/output unit control circuit IOCTL 47 controls the input/output unit IO.

The above-mentioned functional members operate as follows. In this explanation of the operation, the content of a control register will be first related, which control register stores program control words. The program control words, in the example, are loaded in the random access memory RAM.

Figure 2:
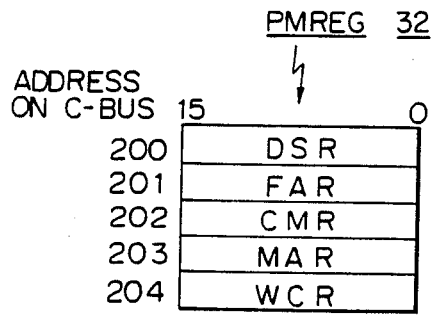
FIG. 2 shows a register structure forming the program mode control register (PMREG)

FIG. 2 shows a register structure forming the program mode control register (PMREG). It should be understood here that the program control words are transferred, via the register PMREG, to the control register formed in the RAM. As seen from FIG. 2, the program control words are set up with a device status register (DSR), a file address register (FAR), a command register (CMR), a memory address register (MAR), and a word count register (WCR), each being composed of 16 bits. These registers are allotted respective addresses, for example, 200 through 204. The addresses are particularly defined on the common bus C-BUS and applied to respective IOC's connecting with the C-BUS.

The above-mentioned registers play the following roles.

(a) The device status register DSR acts as a flag area for indicating a status of the IOC. For example, the statuses "data is now being transferred", "data transfer is finished" and so on, are indicated in the flag area.

(b) The file address register FAR indicates a file address specifying desired file data stored in the magnetic disk unit DKU to be accessed.

(c) The command register CMR controls the starting or stopping of the IOC and commands various operations, for example, a write operation, a read operation, and so on.

(d) The memory address register MAR indicates an address of a main memory (shown by MM 48 in FIG. 1) at which the read data on the C-BUS, from the IO, via the IOC, is to be stored, and indicates an address of the main memory MM from which the data to be written to the IO, via the C-BUS and the IOC, is read.

(e) The word count register WCR indicates how many words of data are to be transferred, i.e., the number of transfer words.

Thus, the IOC can be operated in accordance with the contents of the above mentioned registers, in the following manner.

① To start the IOC, the central control unit CC write operations with respect to the file address register FAR, the memory address register MAR, and the word count register WCR under the program mode (PM), and thus the operations will start for storing the corresponding file address, memory address, and the number of transfer words in respective registers. Assuming that "0" is stored in the register FAR, "100" in the register MAR, and "10" in the register WCR, these conditions actually express "read data from the file 0 in the unit DKU and then ten words of data should be transferred to the memory MM at the address 100".

② The IOC recognizes that, by means of the input/output address matching circuit IOAM, the above mentioned write operations must be effected to its program mode control register PMREG, and thus starts the program mode control circuit PMCTL.

③ The control register PMREG sets therein the above mentioned variety of information given from the central control unit CC and then sends the interruption signal to the microprocessor μP for starting the microprogram.

④ In accordance with the command of the microprogram, the information in the control register PMREG is stored in the specified area of the RAM. Thereafter, the central control unit CC executes, in accordance with the thus stored information in the RAM, a variety of operations such as, for example, an operation through which the IOC circuit is started and desired data is read from a specified sector of the unit DKU.

⑤ The operations up to the storage of information in the specified area are repeated to accumulate all required information in the RAM. When so accumulated, the central control unit CC writes a command to the command register CMR, which command is used to start, for the first time, the entire IOC system. The write operation to the register CMR is also achieved under the program mode (PM), and therefore, an interruption is made to the microprocessor μP and the microprogram is started, as in the aforementioned cases of the registers FAR, MAR, and WCR.

⑥ In accordance with a command from the microprogram, the command in the register CMR is written in the specified area of the RAM. Assuming that the command is, for example, "read operation", the microprogram starts the input/output unit control circuit IOCTL, as in the example described in the above paragraph 4. The circuit IOCTL starts the unit DKU to read data therefrom. The thus read data is momentarily stored, in the form of transfer data (TD) in the RAM, via the internal bus I-BUS.

⑦ The microprogram starts the direct memory access mo control circuit DMACTL to set the read data, stored in the RAM, in the direct memory access mode data register DMAREG, one word by one word, via the internal bus I-BUS. The read data is further sent to the central control unit CC via the common bus C-BUS. In this case, the contents of the registers FAR and MAR are incremented by +1, while the content of the register WCR is decremented by −1, every time a one word transmission is completed.

⑧ When the content of the word count register WCR reaches zero, the microprogram starts the interruption control circuit INTCTL and applies an interruption for finish to the central control unit CC. Also, the microprogram sets an interruption information in the area corresponding to the device status register DSR, in the memory RAM. Thus, a series of operations in the IOC system is finished and the IOC system is left as it is until the next start is effected.

As understood from the above, the conventional IOC suffers from two problems. First, a direct memory access (DMA) transfer is realized by the use of the microprogram, and therefore, a data transmission rate is lowered and a high speed IOC cannot be expected, and second, an interruption to the microprocessor takes place every time the program mode (PM) is activated, and therefore, the construction of the related firmware becomes complicated.

To overcome the above mentioned problems, a person skilled in the art may first conceive of employing a data transfer between the circuit IOCTL and the memory RAM performed under the DMA mode. This concept, however, is not advantageous, since the rate of data transfer between the memory RAM and the common bus C-BUS does not become high, but is left as it is, so that the operation speed of the IOC system is not improved as a whole.

Figure 3:
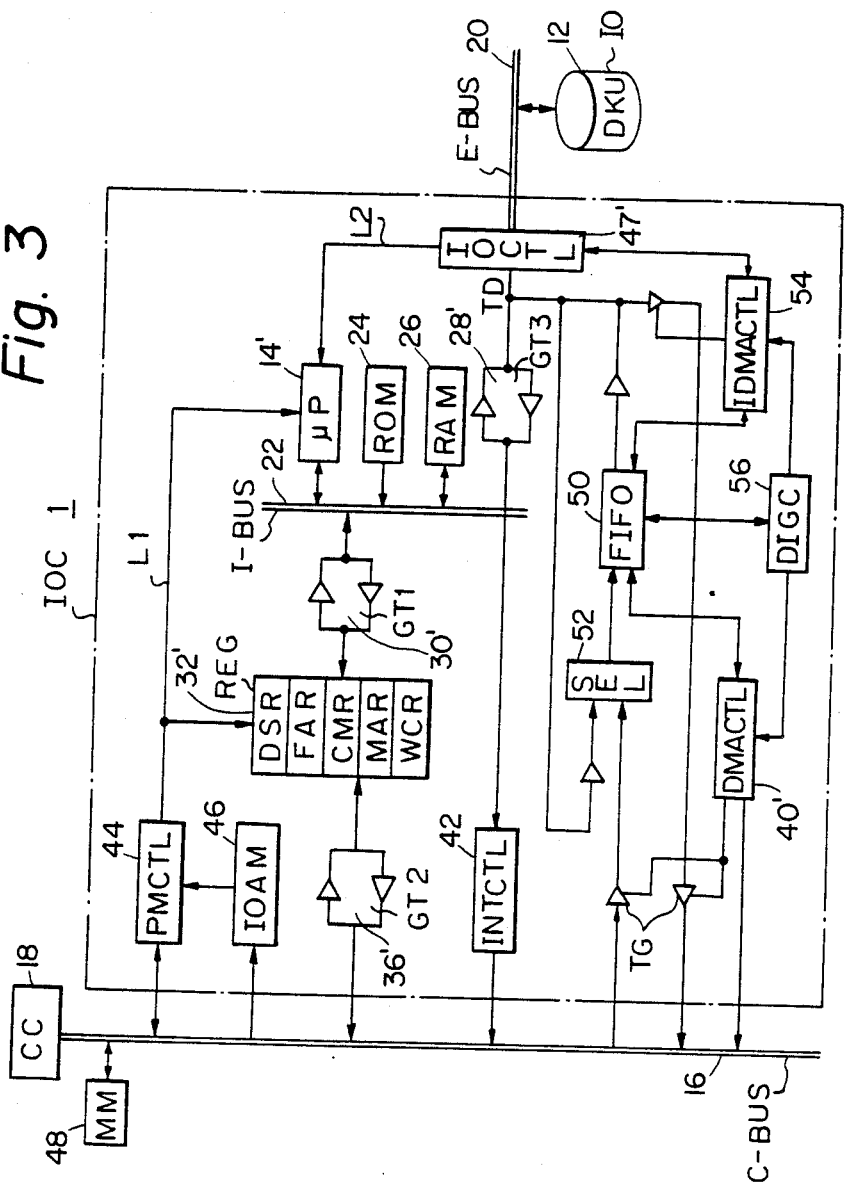
FIG. 3 is a circuit diagram illustrating a principle construction of an input/output control system according to the present invention.

FIG. 3 is a circuit diagram illustrating a principle of the construction of an input/output control system according to the present invention. In FIG. 3, members identical to those of previous figures are represented by the same reference characters (as for all later figures). Therefore, compared with FIG. 1, a major difference in construction, lies in the employment by the IOC system of FIG. 3 of a buffer memory. In the example of the present invention, the buffer memory is comprised of a first-in/first-out (FIFO) memory 50. The IOC system also has a selector (SEL) 52 and an input/output unit direct memory access control circuit (IDMACTL) 54, in addition to the circuit DMACTL. Further, a diagnostic check portion (DIGC) 56 is introduced in the IOC system of the present invention. The DIGC portion is not an indispensable constituent for the present invention, but is beneficial to the present invention. That is, the DIGC carries out a desired diagnostic check operation under control of the microprocessor μP and/or the central control unit CC, of the circuit IDMACTL, the circuit DMACTL and the buffer memory (FIFO).

The buffer memory, e.g., the memory FIFO, momentarily stores the transfer data to be communicated between the common bus C-BUS and the input/output unit control circuit IOCTL. The selector SEL, cooperating with the memory FIFO, selects either transfer data from the internal bus I-BUS or transfer data from the common bus C-BUS. The input/output unit direct memory access control circuit IDMACTL, cooperating with the memory FIFO, achieves control of a data transfer between the input/output unit control circuit IOCTL and the memory FIFO.

In the IOC system of the present invention, both a write operation and a read operation, under the program mode (PM), with respect to a control register REG in the system IOC, are achieved by the use of hardware. When command information is written in the command register CMR, which sends commands for various operations to the system IOC, an interruption is made to the microprocessor μP and then a microprogram is started for activation of the IOC system. When a data transfer series comes to an end, that is, the operation of the IOC system is ended, an interruption is made from the circuit IOCTL to the microprocessor μP to start the microprogram for stopping the data transfer.

The operation of the IOC system is summarized as follows. The DMA transfer of the transfer data, communicated between the IO and the central control unit CC, is achieved without using a microprogram, as in the conventional IOC system. In place of this microprogram, the transfer data traffic is regulated by the memory FIFO. Accordingly, the microprogram is used only first, when the IOC system is to be started, for starting the input/output unit IO in accordance with the contents of the control register REG, and second, when the operation of the system IOC comes to an end, for editing interruption information to be applied to the central control unit CC to execute an interruption command. In conclusion, the IOC system according to the present invention incorporates as many as possible automatic hardware operations, and thus a high speed IOC system can be realized.

The benefits obtained by an employment of the diagnostic check portion DIGC, will be summarized below. As mentioned above, the data transfer is mainly performed with the use of hardware, represented by the memory FIFO, and thus a portion sandwiched between the unit CC and the unit IO (DKU) becomes seemingly empty. Therefore, once a problem occurs during the data transfer, a relatively long time is needed to carry out troubleshooting. That is, it is difficult to rapidly determine whether the problem has occurred in the memory FIFO, the unit IO or the microprocessor $\mu P$. This causes an apparent deterioration in the reliability of the IOC system. To counter this, the diagnostic check portion is introduced thereto, to ensure reliability in the IOC system. The functions of the diagnostic check part are largely classified into two parts. The first function is to stop, at any time, a request for data transfer to the direct memory access mode control circuit DMACTL and/or the input/output unit direct memory access control circuit IDMACTL. The second function is to realize a read/write operation for the memory FIFO, only at the time of the stoppage mentioned above, under the microprogram control. Under the above-mentioned functions, the microprocessor $\mu P$ can achieve a diagnostic check with respect to the memory FIFO alone ... ①, and a diagnostic check with respect to both the memory FIFO and the input/output unit IO alone ... ②, and further, the central control unit CC can achieve agnostic check with respect to the memory FIFO and the common bus C-BUS alone ... ③. If needed, it is possible to process the data fr central control unit CC by way of the memory FIFO and send the thus processed data to the unit IO ... ④. By using the above recited diagnostic checks ①, ②, and ③, it is easy to efficiently distinguish whether the problem has occurred in the memory FIFO side, the central control unit CC side, or the microprocessor $\mu P$ side. Also, by using the above recited data processing ④, it is possible to a cipher data.

Figure 4:
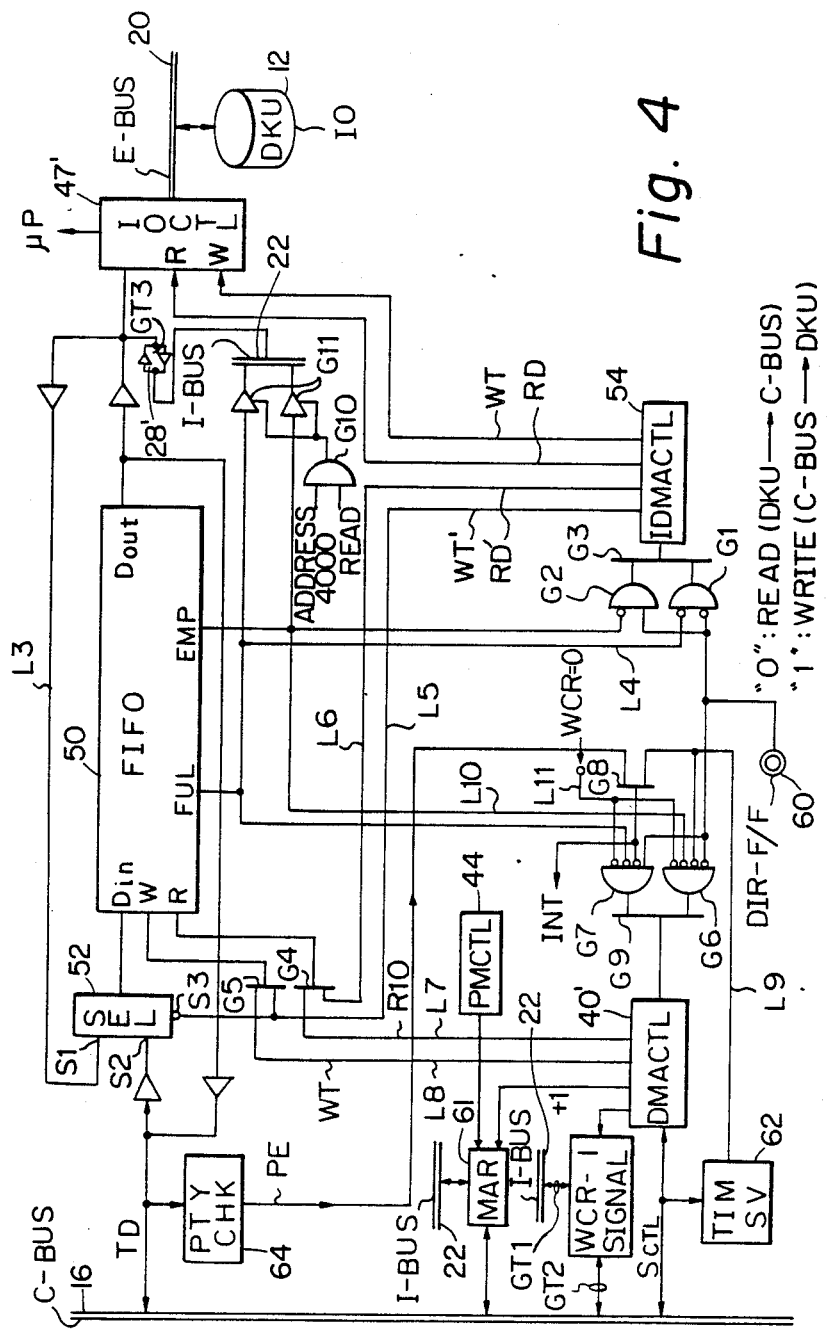
FIG. 4 illustrates a detailed circuit diagram of the memory FIFO shown in FIG. 3 and peripheral circuitry.

FIG. 4 illustrates a detailed circuit diagram of the memory FIFO shown in FIG. 3 and peripheral circuitry, excluding the diagnostic check portion. An explanation thereof will be given below with reference to FIGS. 3 and 4. For this explanation, summaries regarding the functions of the major circuit blocks will be first given. Note, the diagnostic check portion will be explained in detail hereinafter.

(A) EXPLANATION REGARDING FUNCTIONS OF MAJOR CIRCUIT BLOCKS (FIGS. 3 AND 4)

① Common bus (C-BUS)

The common bus C-BUS connects the central control unit CC in common with a plurality of IOC systems, and data is transferred thereto.

② Input/output address matching circuit (IOAM)

The circuit IOAM compares addresses for recognition of each IOC system to which an individual address is allotted in advance. Namely, the circuit IOAM is an address coincidence detection circuit.

③ Program mode control circuit (PMCTL)

The circuit PMCTL performs a transfer control under a program mode (PM).

④ Control register (REG)

The register REG operates as a buffer register to store therein both control information for controlling the input/output control system IOC and indication information for indicating an internal status of the system IOC.

⑤ Microprocessor ($\mu P$)

The microprocessor $\mu P$ functions as a command element for controlling a variety of operations to be achieved in the IOC system, and comprises, for example, a 16-bit microprocessor.

⑥ Read only memory (ROM)

The ROM stores therein a microprogram, i.e., a control program, for the microprocessor $\mu P$.

⑦ Random access memory (RAM)

The RAM momentarily stores therein a variety of information or data to be used in the microprocessor $\mu P$.

⑧ Interruption control circuit (INTCTL)

The circuit INTCTL controls an interruption operation.

⑨ Input/output unit control circuit (IOCTL)

The circuit IOCTL controls the input/output unit IO.

⑩ First-in/first-out memory (FIFO)

The FIFO memory is used for momentarily storing transfer data to be transferred between the common bus C-BUS and the input/output control circuit IOCTL.

⑪ Input/output unit direct memory access control circuit (IDMACTL)

The circuit IDMACTL controls transfer of data between the circuit IOCTL and the FIFO memory. The circuit IDMACTL is an indispensable member for realizing the diagnostic check operation which will be explained in detail hereinafter.

⑫ Direct memory access mode control circuit (DMACTL)

The circuit DMACTL controls transfer of data, under a DMA mode, between the common bus C-BUS and the FIFO memory. The circuit DMACTL is also an indispensable member for realizing the diagnostic check operation which will be explained in detail hereinafter.

⑬ Selector (SEL)

The selector SEL functions as a selection circuit for inputting, to the FIFO memory, either data from the internal bus I-BUS or data from the common bus C-BUS, selectively. The selector SEL is related to the diagnostic check described later.

⑭ Internal bus (I-BUS)

The bus I-BUS is mounted in the processor system having the microprocessor $\mu P$ at a center portion thereof. That is, the bus I-BUS functions as a microprocessor bus. The bus I-BUS is also related to the diagnostic check described later.

(B) EXPLANATION OF ADDRESS MAP (FIG. 5)

An address allocation, viewed from the microprocessor μP, in the IOC system, is referred to as an address map.

Figure 5:
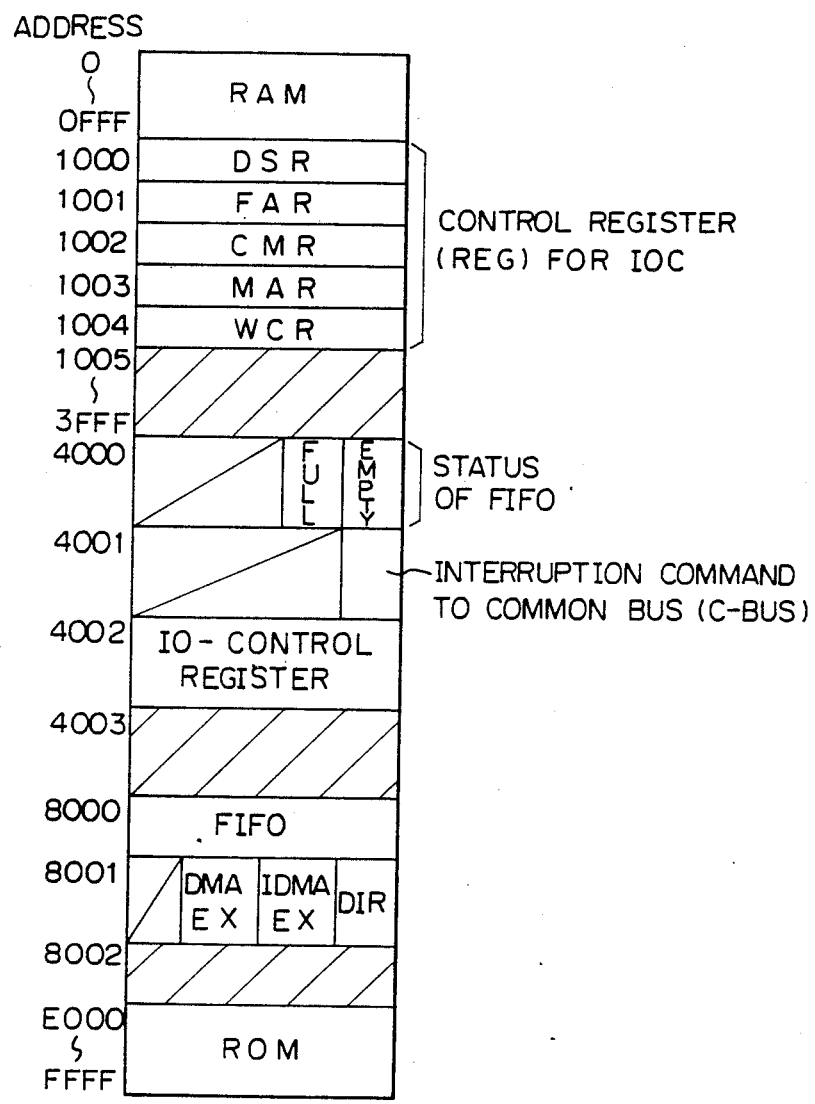
FIG. 5 shows an example of an address map defined in the input/output control system (IOC)

FIG. 5 shows an example of an address map defined in the IOC system.

① The addresses 0 through 0FFF, in terms of hexadecimal notation, are allotted to the random access memory RAM.

② The addresses 1000 through 1004, are allotted to the control register REG, which operates to buffer the program control words and so on for controlling the IOC system. More specifically, the address 1000 is allotted to the device status register DSR, 1001 to the file address register FAR, 1002 to the command register CMR, 1003 to the memory address register MAR, and 1004 to the word count register WCR.

Note, the addresses allotted to the above mentioned registers DSR, FAR, CMR ... are not the same as those shown in previous FIG. 2 by 200, 201, 202 ... This is because, the addresses 200, 201, 202 ... are not addresses viewed from the microprocessor μP, but are defined particularly on the common bus C-BUS, as mentioned previously.

③ In this example, the addresses 1005 through 3FFF are not used.

④ The address 4000 is used for indicating the status of the FIFO memory. The status of the FIFO memory is expressed as "FULL" or "EMPTY". The former status indicates that the FIFO memory is full of transfer data, and the latter status indicates that all of the transfer data has been output from the FIFO memory and no transfer data remains therein.

Note, the above mentioned two statuses can be detected as respective electric signals, output from terminals FUL and EMP provided by the FIFO memory, as shown in FIG. 4.

⑤ The address 4001 is an area used for indicating an interruption command to be issued to the common bus C-BUS.

⑥ The address 4002 is allotted to the control register, mounted in the input/output unit control circuit IOCTL, which buffers control information for controlling the input/output unit IO.

⑦ In the example, the hatched area after the address 4003 is not used.

⑧ The address 8000 is an area used for specifying a write or read operation with respect to the FIFO memory. The address 8000 is effective during the diagnostic check operation by the DIGC.

⑨ The address 8001 is allotted to the information "DIR", "IDMAEX", and "DMAEX". The information DIR (abbreviation of direction) is used for specifying a direction in which the transfer data TD is to be transferred. The information "IDMAEX" and "DMAEX" are effective during the diagnostic check operation by the DIGC, and are used, respectively, for activating the input/output unit direct memory access control circuit IDMACTL and the direct memory access mode control circuit DMACTL.

The aforesaid transfer direction specifying information DIR of one bit assumes the logic "0", where the data is to be transferred from the magnetic disk unit DKU to the common bus C-BUS, i.e., DKU→C-BUS, which represents a read operation "READ" of stored data from the unit DKU (refer to the center bottom of FIG. 4). On the other hand, when the information bit DIR is "1", the information DIR indicates that the data is to be transferred from the common bus C-BUS to the magnetic disk unit DKU, i.e., C-BUS→DKU, which represents a write operation "WRITE" of data to be written in the unit DKU (refer to the center bottom of FIG. 4). As seen at the center bottom of FIG. 4, it can be understood that the above-mentioned transfer direction specifying information DIR is issued from a transfer direction specifying flip-flop DIR·F/F 60, as an output thereof. The flip-flop DIR·F/F is set or reset, via the internal bus I-BUS, by the microprocessor μP in accordance with the information of the command register REG.

⑩ In this example, the hatched area after the address 8002 is not used.

⑪ addresses E000 through FFFF are allotted to the ROM.

Figure 6A:
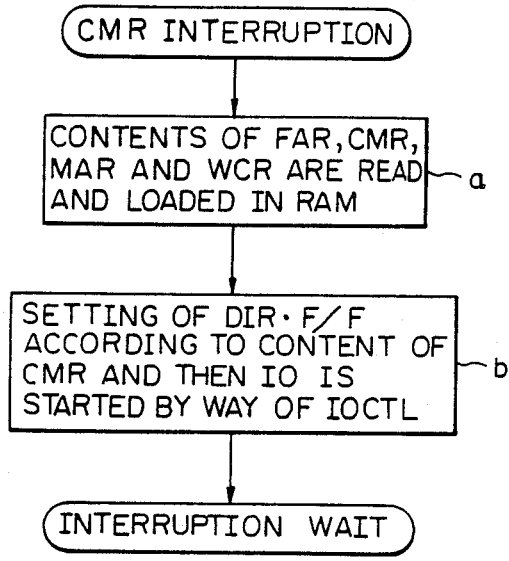
FIG. 6A is a flow chart exhibiting a series of operations generated by a CMR interruption.
Figure 6C:
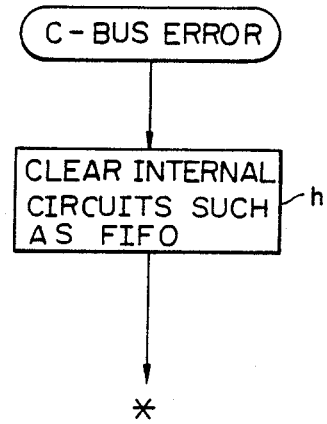
FIG. 6C is a flow chart showing a step generated when a common bus (C-BUS) error occurs.
Figure 6B:
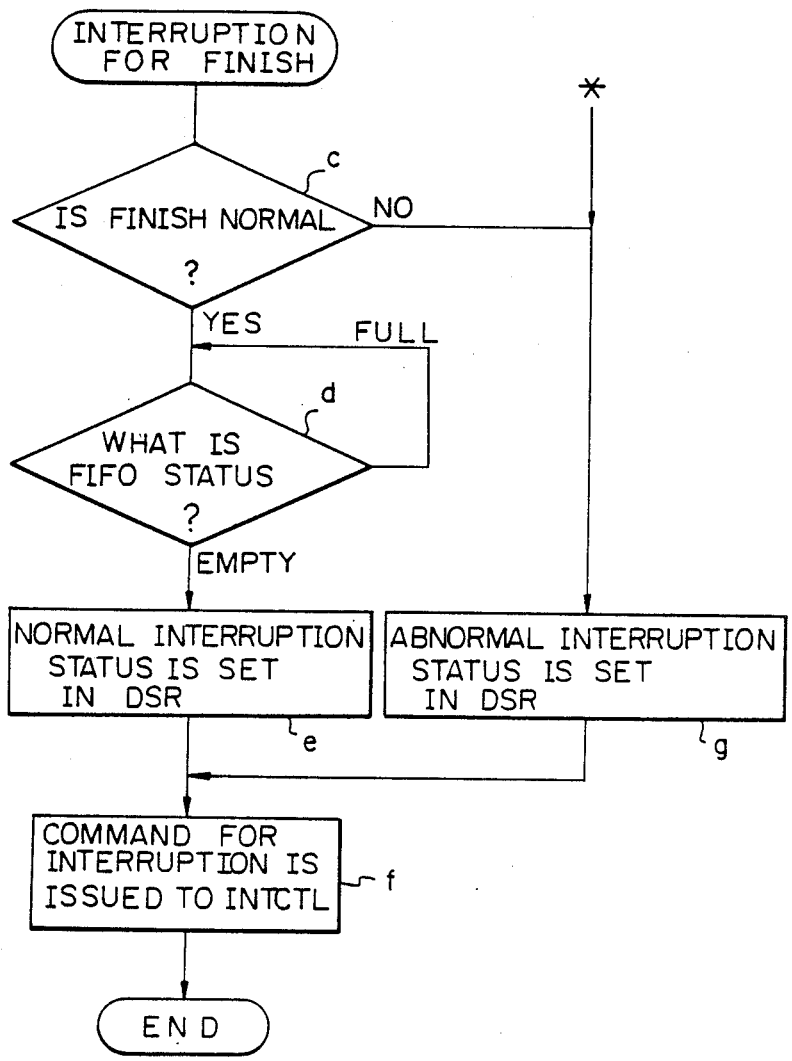
FIG. 6B is a flow chart exhibiting a series of operations generated by an interruption for finish issued from the input/output unit control circuit (IOCTL)

(C) EXPLANATION REGARDING OPERATIONS ACHIEVED INSIDE THE IOC SYSTEM (FIGS. 6A, 6B AND 6C)

Here distinctive operations according to the present invention are first explained with reference to flow charts, and the operations achieved inside the input-/output control system IOC are explained in detail later.

① In the IOC system according to the present invention, the read/write control of information from the unit CC to the registers FAR, MAR 61 and WCR is performed by the program mode control circuit PMCTL. Accordingly, control by the microprogram is little needed here. This results in a realization of high speed input/output control even with the use of relatively simple microprocessor. To be specific, input/output control is attained using only three information elements. The first information element indicates whether or not the content of the word count register WCR becomes zero, the second indicates which direction is specified by the transfer direction specifying flip-flop DIR·F/F, and the third indicates the present status of the FIFO memory, i.e., FULL, EMPTY, or neither. Thus, the data transfer is carried out under a condition as if the data transfer is established without internal circuits inside the IOC system. In this regard, the diagnostic check becomes beneficial, as mentioned previously.

The PMCTL can be comprised of both a sequence controller and an address decoder. The sequence controller is triggered by the IOAM and controlled by a C-BUS control signal given from the C-BUS. The address decoder receives a C-BUS address signal given from the C-BUS. Thus, the sequence controller functions, in accordance with the C-BUS control signal, to generate, first, a timing signal for fetching data, and second, a timing signal for outputting data. The address decoder functions to decode the C-BUS address signal, so that a specified one of the registers in the REG, i.e., DSR, FAR, CMR, MAR and WCR, is activated for the read or write operation. In short, the PMCTL functions to fetch data on the C-BUS data line and set the same in one of the registers in the REG specified by the C-BUS address signal, with a timing predetermined according to a C-BUS protocol. Alternatively, the PMCTL functions to output data to the C-BUS data line, read from the register in the REG specified by the C-BUS address signal, with a timing predetermined according to the C-BUS protocol.

② When command information is set in the control register REG by the central control unit CC, an interruption is made to the microprocessor μP. Thereafter, predetermined operations are sequentially executed as roughly shown by the flow charts of FIGS. 6A, 6B and 6C.

③ FIG. 6A is a flow chart for exhibiting a series of operations generated by a CMR interruption. When the CMR interruption is applied to the command register CMR, a variety of information, which has been written by the central control unit CC into the respective registers FAR, CMR, MAR and WCR, is loaded in the RAM (refer to step "a" in FIG. 6A). Further, according to the command information written in the register CMR, the transfer direction specifying bit DIR (refer to the address 8001 in FIG. 5) is determined, and then the flip-flop DIR·F/F (FIG. 4) is set or reset in conformity with the bit information DIR. At this time, the input/output unit control circuit IOCTL (FIGS. 3 and 4) is started. Further, the circuit IOCTL, after starting the input/output unit IO, controls this unit IO to prepare for the data transfer (refer to step "b" in FIG. 6A). Thereafter, the microprogram waits for the occurrence of a next interruption (refer to "INTERRUPTION WAIT" in FIG. 6A). During the INTERRUPTION WAIT, a diagnostic check is performed inside the IOC system, if necessary.

In the above recited step "a" of FIG. 6A, if the content of the command register CMR loaded in the memory RAM indicates a "read operation", the output logic of the flip-flop DIR·F/F is set as "0" (refer to "0": READ in FIG. 4). In this case, if the status of the FIFO memory is not "FULL", that is, there are empty areas in the FIFO memory, the input/output unit direct memory access control circuit IDMACTL is started to draw data, read from the unit DKU, from the input/output unit control circuit. The thus-obtained data is set in the FIFO memory. Meanwhile, the FIFO memory is placed in a FULL status, so that the activation of the control circuit IDMACTL is released.

When the FIFO memory is not placed in an EMPTY status, that is, data remains in the FIFO memory, the data must be sent to the common bus C-BUS. Each time this data send occurs the content of the memory address register MAR is automatically incremented by +1, to renew the write address for the main memory MM to the next write address. Also, the content of the register FAR is incremented by +1, but the content of the register WCR is decremented by −1. As mentioned above, the data read from the unit DKU is automatically transferred and output to the common bus C-BUS.

In the above recited step "a" of FIG. 6A, if the content of the command register CMR loaded in the RAM indicates a "write operation", the output logic of the transfer direction specifying flip-flop DIR·F/F is set as "1" (refer to "1": WRITE in FIG. 4). In the write operation, as in the above mentioned read operation, the data transfer is smoothly performed through the FIFO memory. At the same time, the registers MAR and FAR are incremented by +1, respectively, while the register WCR is decremented by −1, each time a data transfer is completed. The related incremental and decremental counts are carried out automatically by hardware.

④ FIG. 6B is a flow chart for exhibiting a series of operations generated by an interruption for finish issued from the input/output unit control circuit (IOCTL). When a transfer of a predetermined amount of data is finished, the circuit IOCTL issues an interruption for finish to the microprocessor μP. At this stage, some transfer data may not yet have been transferred, and remains in the memory FIFO. Therefore, after confirmation that the FIFO memory is in the EMPTY status, an interruption is issued to the interruption control circuit INTCTL, whereby a series of data transfers is completed.

In step "c" of FIG. 6B, it is determined whether the finish of the control circuit IOCTL is normal (YES) or not (NO). When the finish is normal, step "d" follows thereafter. In step "d", it is determined whether the status of the FIFO memory is EMPTY or FULL. If the memory FIFO is in the EMPTY status, step "e" follows thereafter.

In step "e", a normal interruption status is set in the device status register DSR.

Thereafter, in step "f", a command for an interruption is issued to the interruption control circuit INTCTL.

In step "c", if it is determined that the finish is not normal or an error occurs in the common bus C-BUS, the operation is brought to an end at step "g". In step "g", an abnormal interruption status is set in the device status register DSR. In this case, the interruption for finish operation may be carried out not immediately by an interruption request, but by a resultant condition after a plurality of activations of the circuit IOCTL.

⑤ FIG. 6C shows the step generated when a common bus (C-BUS) error occurs. Step "h" of FIG. 6C is led to step "g" of FIG. 6B via the symbols *. If the problem occurs on the common bus C-BUS side, the related internal circuits, such as the FIFO memory, are clear. In this case, the location of the error source can be found by an investigation of the contents of the registers, such as MAR, WCR, and so on. Note, the occurrence, per se, of a problem in the common bus C-BUS side can be immediately detected through the diagnostic check described later.

(D) EXPLANATION OF OPERATIONS ACHIEVED IN IOC SYSTEM (FIG. 3)

When a start command is generated in the central control unit CC, a series of required information is written in the control register REG. In this case, a write operation to the command register CMR is particularly important, since an interruption to the microprocessor μP occurs under the condition wherein the above mentioned write operation is made. A line L1 in FIG. 3 indicates a route through which the related interruption command is transmitted to the microprocessor μP.

When the interruption occurs, the contents of the control register REG are read out under the instruction of the microprogram, and an analysis is then made to determine what is to be done. The analysis is made through the ROM and RAM. According to the result of the analysis, if the microprocessor μP recognizes that the input/output unit IO must be started, the magnetic disk unit DKU, in this example, is started.

The data transfer between the thus-started unit DKU and the common bus C-BUS is performed without using the internal bus I-BUS, but by way of the FIFO memory. The FIFO memory is commonly used, as is widely known, to output first-in data first. The first-in data is input to the FIFO memory via the selector SEL, as seen from FIGS. 3 and 4. The data transfer between the unit IO and the FIFO memory is chiefly controlled by the input/output unit direct memory access control circuit IDMACTL. The circuit IDMACTL is subjected to the following conditions. It should be noted here that, although a start command is first issued from the microprocessor μP, the overall control is actually performed in accordance with the status of the FIFO memory. First, if the FIFO memory is in an EMPTY status, the input/output unit control circuit IDMACTL is started, so that the data read from the magnetic disk unit DKU is entered in the FIFO memory. Conversely, if the FIFO memory is not in an EMPTY status, the direct memory access mode control circuit DMACTL is started, so that the read data in the FIFO memory is output to the common bus C-BUS. Through the output operation, when the FIFO memory is in a non-FULL status the control circuit IDMACTL is started again, so that the next data read from the unit DKU is entered in the FIFO memory. Thus, two identical operations are repeated thereafter. That is, the read data is entered in the FIFO memory, and at the moment when the FIFO memory is placed in a non-EMPTY status, the control circuit DMACTL is started. Conversely, the read data is output from the FIFO memory, and at the moment when the FIFO memory is placed in a non-FULL status, the control circuit IDMACTL is restarted. Thus, the transfer data is output from and input to the FIFO memory continuously. In this case, there may be an imbalance between the amounts of read data input and output, however, this imbalance can be absorbed by the FIFO memory. The capability for such absorption is defined by the capacity of the FIFO memory. Of course, the larger the memory capacity, the larger the capability for the above mentioned absorption, and therefore, the imbalance can be ignored.

In FIG. 3, the gate GT3 is, for example, an open-collector type gate, which enables a selective cut off between the internal bus I-BUS side and the FIFO memory side, as also shown in FIG. 4. Further, each transfer gate TG is controlled to open and close selectively in accordance with whether the write operation (a data transfer from the common bus C-BUS) or the read operation (a data transfer to the common bus C-BUS) is to be achieved. Furthermore, the microprocessor μP is informed of an interruption for finish from the input/output unit control circuit IOCTL (refer to FIG. 6B), via a line L2.

(E) EXPLANATION OF OPERATIONS ACHIEVED IN THE IOC SYSTEM (FIG. 4)

The IOC system according to the present invention is featured by, first, high speed operation, and second, operational high reliability. The high speed operation is realized, since the data transfer is achieved mainly by hardware, as understood from FIG. 4. First, the input/output unit IO, i.e., the magnetic disk unit DKU, is started, via the input/output unit control circuit IOCTL, by the microprocessor μP and a command for data transfer is given to the unit DKU. Assuming that the command for data transfer indicates a read operation of data from the magnetic disk unit DKU, the thus read data is supplied to the FIFO memory. The data is supplied along a route such as; unit DKU→control circuit IOCTL→line L3 (via a buffer amplifier indicated by triangle symbol)→selector SEL→input terminal $D_{in}$. The above read operation, commanded by the circuit IDMACTL, is commenced when certain conditions are satisfied. First, the transfer direction specifying flip-flop DIR·F/F (corresponding to DIR at address 8001 in FIG. 5) is set as logic "0", i.e. READ. The logic "0" from the DIR·F/F is applied to a gate G1 at one input thereof, and accordingly, if the logic "0" is also applied to the other input thereof, the gate G1 is opened. (Note: each small circle, i.e., o, denotes logical inversion, as for all later figures). Therefore, the gate G1 is opened if the FIFO memory is in a non-FULL status, where the related input of the gate G1 is connected via a line L4 to the terminal FUL of the FIFO memory.

When the gate G1 is opened, the input/output unit direct memory access control circuit is started, via a gate G3 which is an OR gate, so that a signal RD, i.e., read command, is issued therefrom and the circuit IOCTL is instructed, by the signal RD, to operate under a read mode (R). Then the read operation of data from the unit DKU commences. A signal WT indicates a command for write, which is applied to the circuit IOCTL at an input W thereof, which represents a write mode.

The thus read data from the magnetic disk unit DKU is supplied to the FIFO memory, via the line L3 and the selector SEL. The input terminal S1 of the SEL is made conductive under the condition where the write operation is not specified. An input terminal S3 of the SEL is connected, via a line L5, to the circuit IDMACTL at a supply terminal thereof of a signal WT', i.e., a write command. In this case, the FIFO memory must be operated under the write mode (W). This condition is satisfied by the reception of the command signal WT' for a write operation, which is given to the FIFO memory at the write mode specifying terminal W, thereof, via a gate G5, i.e., an OR gate.

If the FIFO memory is not in the FULL status, the read data stored in the FIFO memory is output from an output terminal $D_{out}$ thereof to the common bus C-BUS. During the output of the read data to the common bus C-BUS, the FIFO memory must be operated under the read mode (R). The read mode (R) is set by first starting the circuit DMACTL and then applying a command signal RD for a read operation from the circuit DMACTL to the FIFO memory at a read specifying terminal R thereof, via a line L7 and the gate G4.

In the above case, the condition wherein the control circuit DMACTL is started is that in which three inputs of a gate G6, i.e., an AND gate, are all supplied with logic "0", except for an input thereof led to the flip-flop DIR·F/F. The latter input is now supplied with the logic "0", since the read operation is now conducted. Due to the thus opened gate G6, the output from the gate G6 starts the control circuit DMACTL via a gate G9, i.e., an OR gate. Accordingly, a transfer of the stored data commences from the FIFO memory to the common bus C-BUS.

The above-mentioned three inputs of the gate G6, except for the input led to the DIR·F/F, are supplied with three kinds of signals, respectively. First is a time out signal given from a time supervisor (TIMSV) 62 via a line L9, which indicates a time out occurring on the common bus C-BUS. Second is a signal indicative of EMPTY given, via a line L10, from the terminal EMP of the FIFO memory. Third is a signal indicative of "WCR=0" given from the register WCR in the control register REG (FIG. 3). With the reception of these signals, the gate G6 is opened, which signals represent that, first a time out has not occurred on the common bus C-BUS, second, the FIFO memory is not in the EMPTY status, and third the word count number (WCR) is not zero. The above mentioned common bus time out specifically means a time out of a control signal $S_{CTL}$ given to the common bus C-BUS side. To be specific, the time out occurs in a case where, although the control circuit DMACTL issued a request in the form of the signal $S_{CTL}$ for outputting the stored data in the FIFO memory to the common bus C-BUS, a response thereto is not made from the central control unit CC, even though a predetermined time has elapsed.

The content of the memory address register MAR is incremented by +1 under control of the circuit DMACTL, each time stored data is read out from the FIFO memory. On the other hand, the content of the word count register WCR is sequentially decremented by −1. When the content of the register WCR reaches zero, the control circuit DMACTL stops sending data to the common bus C-BUS. This is common to both the write operation and read operation, and therefore, the signal indicative of "WCR=0" is supplied to not only the gate G6 but also a gate G7, i.e., an AND gate. In this case, information indicating the EMPTY status of the FIFO memory, other than the above information indicative of "WCR=0", is also necessary to release the activation of the control circuit DMACTL.

Similarly, in a write operation, a value corresponding to an amount of data to be transferred is preset in the register WCR. Therefore, since the content of the register WCR does not reach zero at that time, a write request for the unit DKU is sequentially issued from the input/output system IOC side, i.e., a master side under the DMA mode, to the central control unit CC side, i.e., a slave side under the DMA mode. The above mentioned write request for the unit DKU is generated under the write mode in which the transfer direction specifying flip-flop DIR·F/F provides, at an output thereof, the logic "1" applied to the gate G7, and the gate G7 receives, other than the logic "1", three kinds of signals of the logic "0" at the other three inputs thereof. Under this condition, the control circuit DMACTL is started for the write operation. The three kinds of signals indicate, first information indicating "WCR=0", second information indicating the FULL status of the FIFO memory, and third information indicating a first condition signal and/or second condition signal output from a gate G8, i.e., an OR gate. The first condition signal relates to the aforesaid time out of the common bus, and the second condition signal relates to a parity error occurring on the common bus. A logical inversion of these three signals is applied to the related gate G7. The output from the gate G8 is also used as an interruption information INT to the microprocessor μP. The above mentioned parity error on the common bus is output as an information PE from a parity check part PTYCHK 64. The parity check part PTYCHK executes a parity check with respect to the write data on the common bus C-BUS, which data is to be supplied, via an input terminal S2 of the selector SEL, to the input terminal $D_{in}$ of the FIFO memory.

When the gate G8 is opened, the control circuit DMACTL issues the command signal WT for a write operation, which is given via the gate G5 to the FIFO memory to place it in the write mode (W). On the other hand, so long as the FIFO memory is not in the EMPTY status (data remains in the FIFO), the control circuit IDMACTL is started continually to issue the command signal WT for a write operation to the control circuit IOCTL to place the same in the write mode (W). A write command has already been given, from the microprocessor μP, to the magnetic disk unit DKU, via the control circuit IOCTL.

In FIG. 4, the gates G6 and G7 further commonly receive the bit indicative of the DMAEX (refer to the address 8001 in FIG. 5) and the gates G1 and G2 further commonly receive the bit indicative of the IDMAEX (refer to the address 8001 in FIG. 5) at their respective inputs; note, these inputs are not illustrated for brevity.

(F) EXPLANATION OF THE FIFO MEMORY (FIG. 7)

The FIFO memory is important as the buffer memory in the present invention, and therefore, will be explained in detail below.

Figure 7:
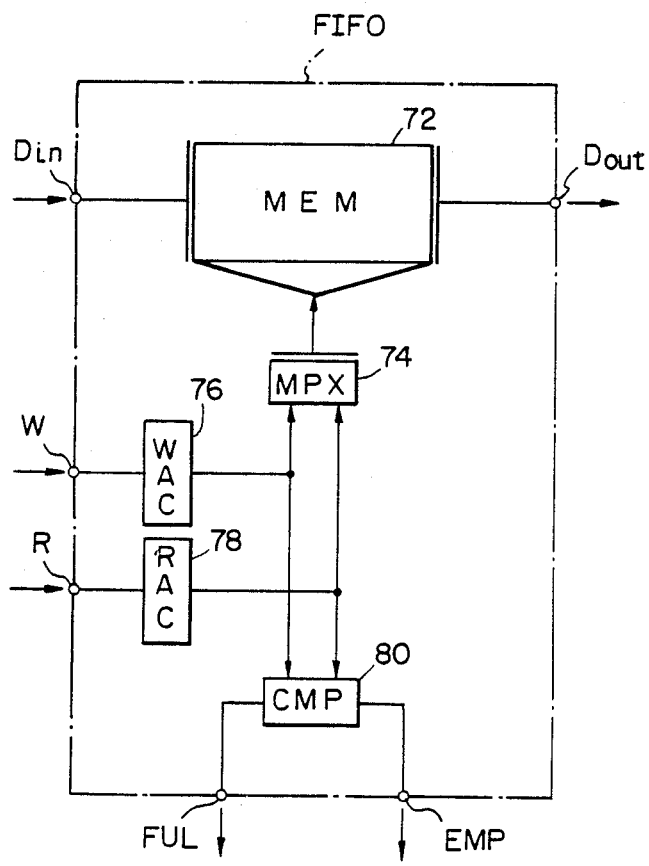
FIG. 7 illustrates a detailed example of the memory FIFO.

FIG. 7 illustrates a detailed example of the FIFO memory. The meanings of the characters $D_{in}$, $D_{out}$, W, R, FUL and EMP have already been explained with reference to FIG. 4. The write data, at the terminal Din, is momentarily stored in a memory MEM 72. The thus stored data is read sequentially from the first-in write data and output, as read data, at the terminal $D_{out}$. The read and write operations therefor are achieved in accordance with each address signal supplied from a multiplexer MPX 74. The multiplexer MPX produces the two outputs, selectively, from a write address counter WAC 76 and a read address counter RAC 78. The write address counter WAC is incremented by +1 every time the command signal WT for a write operation (FIG. 4) is generated, while the read address counter RAC is incremented by +1 every time the command signal RD for a read operation (FIG. 4) is generated, whereby the corresponding data is written therein and read therefrom, respectively. When the contents of the counters RAC and WAC coincide with each other, a comparator CMP 80 produces a signal indicative of the EMPTY status from the terminal EMP. When the content of the counter WAC becomes equal to the content of the counter RAC subtracted by 1, i.e., RAC−1=WAC, the comparator produces a signal indicative of the FULL status from the terminal FUL. No output is produced from the terminals FUL and EMP so long as neither the FULL status or the EMPTY status exists in the FIFO memory. The multiplexer MPX is operated under the so-called time division multiplex method to achieve the write operation and read operation, alternately, where the write and read operations may collide.

(G) EXPLANATION OF THE DIAGNOSTIC MODE (FIGS. 8A THROUGH 8C)

As mentioned previously, the IOC system according to the present invention can operate at a high speed, since the data transfer is controlled mainly by the use of hardware, automatically. It is not, however easy to rapidly determine the source of a malfunction when such a problem occurs. This is because the portion sandwiched between the CC and IO units appears to be empty due to the automatic data transfer control by the hardware. To counter this, the diagnostic check portion DIGC (FIG. 3) is further incorporated in the IOC system of the present invention, whereby a special diagnostic mode is established to detect the source of any malfunction.

FIG. 8A illustrates a schematic general view for explaining the diagnostic check with respect to the FIFO memory. That is, FIG. 8A shows a diagnostic mode for the FIFO memory. Under the diagnostic mode, the aforesaid commands for data transfer, performed with the FIFO memory, are stopped. These commands are issued from the control circuits DMACTL and IDMACTL. Note, the circuits DMACTL and IDMACTL are not illustrated in FIG. 8A. Thus, both the units CC and IO are cut off from the FIFO memory.

Next, a predetermined diagnostic check data DD is written, via a route I, in the FIFO memory, under control of a microprogram, by the microprocessor $\mu P$. The data DD can be stored in advance in the ROM (FIG. 3). The thus written data DD is then read therefrom and sent to the microprocessor $\mu P$, via a route II. If no problem exists in the FIFO memory, the data DD is correctly returned to the microprocessor $\mu P$.

FIG. 8B illustrates a schematic general view for explaining the diagnostic check with respect to both the memory FIFO and the unit IO. That is, FIG. 8B shows a diagnostic mode for both the FIFO and the IO. Under the diagnostic mode, the circuit DMACTL stops issuing the aforesaid command for data transfer to the FIFO memory, and thus only the circuit IDMACTL operates as usual. Note, only the circuit IDMACTL is illustrated in FIG. 8B. Thus, first the central control unit CC is cut off from both the FIFO memory and the input/output unit IO.

Next, under control of a microprogram by the microprocessor $\mu P$, a predetermined diagnostic check data DD is written, via a route I, in the FIFO memory, read again from the FIFO memory, and is written in the input/output unit IO via a route II. The thus written data DD in the unit IO is read via a route III, written in the FIFO memory, and read again therefrom to be again sent to the microprocessor $\mu P$ via a route IV. If no problems exist in both the FIFO memory and the unit IO, the data DD is correctly returned to the microprocessor $\mu P$. If the data DD is not correctly returned, it is determined that a malfunction exists in the FIFO memory and/or the unit IO, and an alarm is issued from the microprocessor $\mu P$ to warn of the occurrence of a malfunction.

In the above mentioned case, a further investigation must be made to determine whether the problem has occurred in the FIFO memory or in the unit IO. If the FIFO memory is normal, it is judged that the problem exists in the IO unit. Conversely, if the FIFO memory is abnormal, it is possible that the malfunction exists in both the FIFO memory and the IO unit. In this case, it is necessary to first repair the FIFO memory and then determine whether or not the IO unit is abnormal. Note, the diagnostic mode for the FIFO memory, mentioned previously in reference to FIG. 8A, can be utilized for the investigation into whether the FIFO memory is normal or abnormal.

FIG. 8C illustrates a schematic general view for explaining the diagnostic check with respect to both the FIFO memory and the common bus C-BUS. That is, FIG. 8C shows a diagnostic mode for both the FIFO memory and the C-BUS. Under the diagnostic mode, the circuit IDMCTL stops issuing the aforesaid command for data transfer to the FIFO memory, and thus only the circuit DMACTL operates as usual. Note, only the circuit DMACTL is illustrated in FIG. 8C. Thus, first the input/output unit IO is cut off from both the FIFO memory and the central control unit CC.

Next, under control of the microprogram by the central control unit CC, a predetermined diagnostic check data DD is written, via a route I, in the FIFO memory, read again from the FIFO memory, and fetched by the microprocessor $\mu P$ via a route II. The data fetched by the microprocessor $\mu P$ is written to the FIFO memory again via a route III. The thus written data is read out again by the central control unit CC via a route IV. If no problem exists in either the FIFO memory or the common bus C-BUS, the data DD is correctly returned to the central control unit CC. If the data is not correctly returned thereto, it is determined that a problem exists in the FIFO memory and/or the common bus C-BUS. Thereby, an alarm is issued from the central control unit CC to warn of the occurrence of the problem.

In the above mentioned case, a further investigation must be made into whether the problem has occurred in the FIFO memory or in the common bus C-BUS. If the FIFO memory is normal, it is judged that the problem exists in the common bus C-BUS. Conversely, if the FIFO memory is abnormal, it is possible that the problem exists in both the FIFO memory and the common bus C-BUS. In this case, it is necessary to first repair the FIFO memory and then investigate whether or not the common bus C-BUS is abnormal. Note, the diagnostic mode for the FIFO memory, mentioned previously in reference to FIG. 8A, can be utilized for the investigation into whether the FIFO memory is normal or abnormal.

Figure 9:
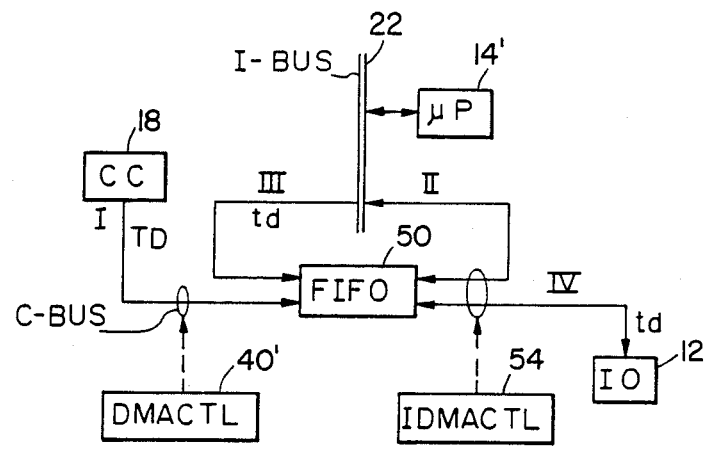
FIG. 9 illustrates a schematic general view for explaining a data processing mode by the microprocessor μP.

FIG. 9 illustrates a schematic general view for explaining a data processing mode by the microprocessor $\mu P$. In the data processing mode, the transfer data TD provided from the central control unit CC is processed by the microprocessor $\mu P$, and the thus processed data is written, as a processed data td, in the IO unit. Under the processing mode, both the circuits DMACTL and IDMACTL operate as usual. In this case, the processed data td may be used as cipher data to be kept secret.

First, a transfer data TD, required to be kept secret, is provided from the central control unit CC via a route I to be written in the FIFO memory, under control of the circuit DMACTL. Thereafter, the thus written data is read from the FIFO memory and sent to the microprocessor $\mu P$ via a route II. The microprocessor $\mu P$ provides a predetermined processing to the data given and then the thus processed data td is written in the FIFO memory via a route III. The data td is read therefrom and written in the IO unit via a route IV under control of the circuit IDMACTL. Thus, the cipher data can be stored in the IO unit.

(H) EXPLANATION OF THE DIAGNOSTIC CHECK PART DIGC (FIG. 10)

Figure 10B:
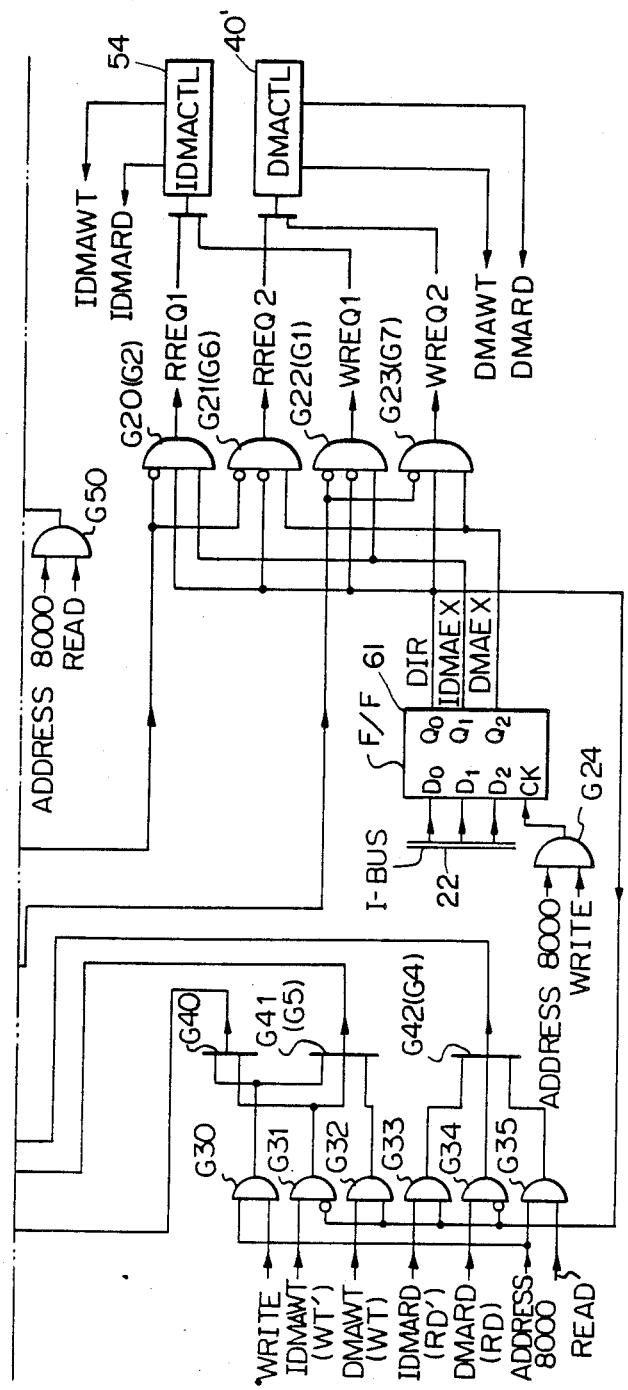

FIGS. 10A and 10B illustrate an example of a detailed circuit diagram of the diagnostic check portion (DIGC) cooperating with the FIFO memory. In FIGS. 10A and 10B, the meanings of the characters C-BUS, E-BUS, I-BUS, SEL, FIFO, IDMACTL, DMACTL are identical to those explained previously. Also, the characters "DIR", "IDMAEX" and "DMAEX" have already been explained in relation to the address 8001 of FIG. 5. The output "DIR" is produced from the flip-flop F/F which is represented by a double circle symbol at the center bottom in FIG. 4. In actuality, however, it is comprised of three sets of flip-flops indicated by the character F/F. The flip-flop F/F is provided with three D-inputs, i.e., $D_0$, $D_1$ and $D_2$, and with three Q-outputs, i.e., $Q_0$, $Q_1$ and $Q_2$. The output $Q_0$ produces the transfer direction specifying information DIR, the output $Q_1$ produces information for activating the input/output unit direct memory access mode control circuit ID- MACTL and the output $Q_2$ produces information for activating the direct access mode control circuit DMACTL. The information for activation IDMAEX and DMAEX are commands to decide whether or not the data transfer, between the FIFO and the C-BUS (including the CC), must be executed. To be specific, if the information DMAEX assumes the logic "1", the control circuit DMACTL is activated, and if the information IDMAEX assumes the logic "1", the control circuit IDMACTL is activated. It is important that the DIGC portion is controlled by these sets of information for activation. For example, when the read operation, i.e., the data transfer from the IO unit to the FIFO memory, is carried out, the transfer direction specifying information DIR assumes the logic "0", as mentioned previously. At this time, one of the conditions for opening both gates G21 and G22 is satisfied. The gates G21 and G22, each being an AND gate, correspond to the aforesaid gates G6 and G1 of FIG. 4. Further, a write request WREQ1 is applied from the gate G22 to the control circuit IDMACTL if the conditions are satisfied that the FIFO memory is not in the FULL status and also the information for activation IDMAEX is made logic "1". Thereby, the data read from the unit IO is supplied to the FIFO memory.

Further, the gate G21 is opened if the conditions are satisfied that the information DIR is made logic "0", the memory FIFO is not in the EMPTY status, and the information for activation of DMAEX assumes the logic "1", so that a read request RREQ2 is output therefrom to the control circuit DMACTL. Thereby, the stored data in the FIFO memory is read therefrom and sent to the common bus C-BUS.

On the other hand, when the write operation i.e. the data transfer from the FIFO memory to the IO unit, is carried out, the transfer direction specifying information DIR assumes the logic "1", as mentioned previously. At this time, one of conditions for opening both gates G20 and G23 is satisfied. The gates G20 and G23, each being an AND gate, correspond to the aforesaid gates G2 and G7 of FIG. 4. Further, a write request WREQ2 is applied from the gate G23 to the control circuit DMACTL if the conditions are satisfied that the FIFO memory is not in the FULL status and also the information for activation of DMAEX is made logic "1". Thereby, the transfer data from the common bus C-BUS is supplied to the FIFO memory.

Further, the gate G20 is opened if the conditions are satisfied that the information DIR is made logic "1", the memory FIFO is not in the EMPTY status, and the information for activation IDMAEX assumes the logic "1", so that a read request RREQ1 is output therefrom to the control circuit IDMACTL. Thereby, the data stored in the FIFO memory is read therefrom and sent to the IO unit.

Thus, a variety of the requests, i.e., RREQ1, RREQ2 and so on, are generated by using the outputs from the flip-flop F/F and so on. The flip-flop F/F is supplied, at the clock input CK thereof, with the output from a gate G24, which is an AND gate. The gate G24 applies the clock pulse to the input CK every time the write command "WRITE" from the microprocessor $\mu P$ is issued, which command is first written in the register REG (FIG. 5) at the address thereof, for example 8001. Further, respective commands are given via the internal bus I-BUS and applied to the D-inputs $D_0$, $D_1$, and $D_2$.

The read operation from the FIFO memory is achieved every time a read command "READ" is issued from the microprocessor $\mu P$ and set in the register REG (FIG. 5) at the address 8000 thereof. To be specific, among the gates G30 through G35 (refer to left side of FIG. 10), each being an AND gate, the gate G35 is opened by the "READ" command (when the write command "WRITE" is issued, gate 30 is opened). Then the output from the gate G35 passes through a gate G42 (corresponding to the gate G4 of FIG. 4), the gates G40 through G42 each being an OR gate, so that the memory FIFO is operated under the read mode (R). At this time, a gate G50 (illustrated at right bottom side of FIFO memory) is also necessarily opened to make a gate G51, i.e., a transfer gate, active, and thereby a transfer route led to the internal bus I-BUS, is made conductive. On the other hand, a transfer route, led to the external bus E-BUS, is made conductive by a gate G52, i.e., a transfer gate, which is made active by the information for activation IDMAEX. Note, during the read operation under the usual DMA transfer mode, both gates G33 and G34 are opened, respectively, by a read request IDMARD and a read request DMARD. These requests IDMARD and DMARD (corresponding to signals RD' and RD shown in FIG. 4) are given from the control circuits IDMACTL and DMACTL, respectively. Therefore, these gates G33 and G34, together with the gate G42, comprise the gate G4 shown in FIG. 4.

The operation to write to the first-in-/first-out memory FIFO is achieved every time a write command "WRITE" is issued from the microprocessor $\mu P$ and set in the register REG (FIG. 5) at the address 8000 thereof. The write command bit is applied to a gate G60 (AND gate) and activates a gate G61 (transfer gate) to make a transfer route from the I-BUS conductive. A transfer route to the external bus E-BUS, is made conductive by a gate G62, i.e., a transfer gate, which is made active by the information for activation IDMAEX. Note, during the write operation under the usual DMA transfer mode, both gates G31 and G32 are opened, respectively, by a write request IDMAWT and a write request DMAWT. These requests IDMAWT and DMAWT (corresponding to signals WT' and WT shown in FIG. 4) are given from the control circuits IDMACTL and DMACTL, respectively. Therefore, these gates G31 and G32, together with the gate G41, comprise the gate G5 shown in FIG. 4.

Throughout the descriptions mentioned above, it is believed that the spirit and basic concept of the present invention can be sufficiently comprehended by persons skilled in the art. Supplemental explanations, however, will be given below in order to further clarify the IOC system according to the present invention, by disclosing detailed examples thereof.

Figure 11A:
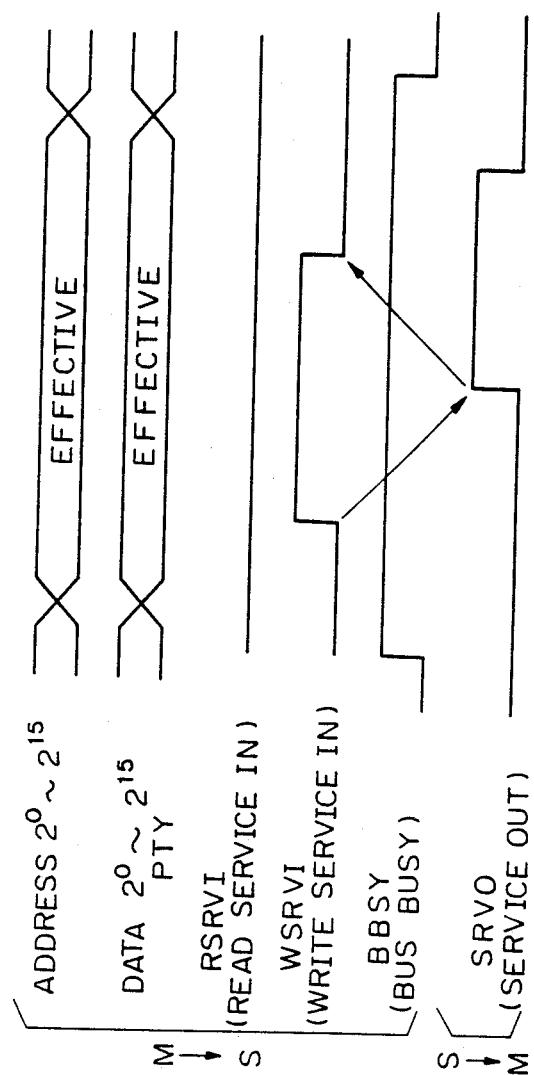
FIGS. 11A and 11B depict timing charts for explaining an information transfer carried out on the common bus C-BUS.
Figure 11B:
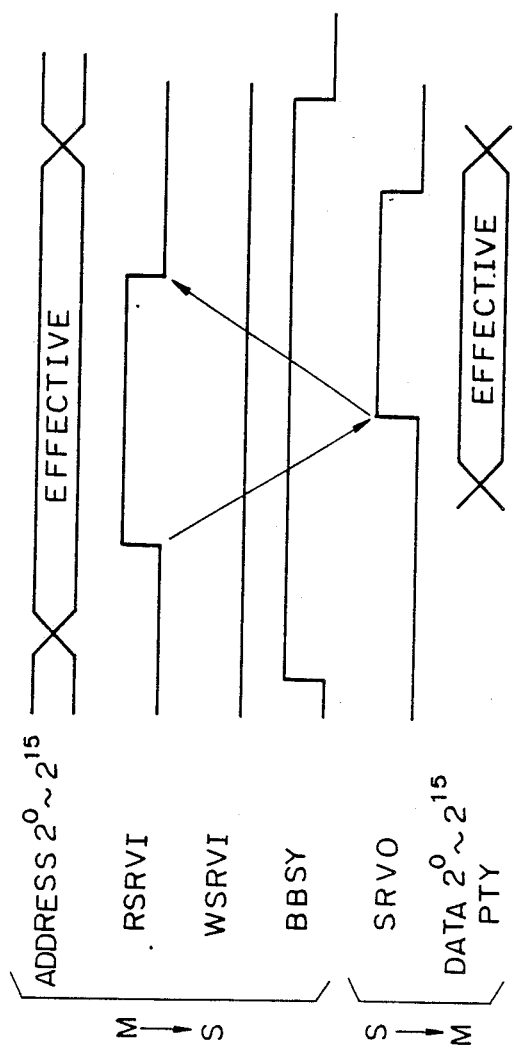

FIGS. 11A and 11B depict timing charts for explaining an information transfer carried out on the common bus C-BUS. As seen from these figures, the information transfer is carried out between a master device M and a slave device S at any time. The transfer is commanded from the master device M at any time and, where the central control unit CC acts as the master device M, is known as a program mode (PM) transfer, and where the IOC system acts as the slave device S, it is known as a direct memory access (DMA) mode transfer.

When a device, provided by the bus C-BUS, acts as the master device M, it is necessary to execute a sequence for acquiring a bus activation right. This is not particularly pertinent, and therefore, no further explanation will be given.

The information transfer from the master device M (hereinafter simply master M) to the slave device S (hereinafter simply slave S), i.e., M→S, is executed as follows.

(1) The master M issues a signal BBSY having a logic "1", which signal indicates, to other devices, that the bus is now being activated, i.e., a bus busy signal.

(2) The master M issues, to address bits $2^0$ through $2^{15}$, an address of the control register REG in the IOC system, under the PM, and an address of a memory inside the CC, under the DMA. At the same time, a parity of data is issued on a parity line PTY.

(3) The master M issues information to data bits $2^0$ through $2^{15}$.

(4) The master M makes a signal WSRVI logic "1", so that the slave S is informed that the information is supplied to the C-BUS; this signal is the so called write service in signal.

(5) When the slave S detects that the logic of the signal WSRV is "1", it receives the data and stores the same at a portion specified by the address bits. This portion is the register REG under the PM, and is the DMA memory under the DMA. At the same time, the, slave S makes a signal SRVO to be logic "1"; this signal is the so called service out signal.

(6) When the master M detects that the logic of the signal WSRVI is "1", it stops sending both the address and data and changes the logic of the signal BBSY to "0".

The information transfer from the slave S to the master M, i.e., S→M, is executed as shown below.

(1) The first step is identical to that recited in the above paragraph (1) in the case of "M→S".

(2) The second step is also identical to that recited in the above paragraph (2) in the case of "M→S".

(3) The master M makes the logic of a signal RSRVI "1" to instruct the slave S to send the information to the C-BUS. This signal is the so-called read service in signal.

(4) When the slave S detects that the signal RSRVI assumes the logic "1", it reads out information from a portion specified by the address on the address line, and then sends the same to the C-BUS.

(5) The slave S changes the logic of a signal SRVO to "1", indicating that the information is supplied to the C-BUS. This signal is the so-called service out signal.

(6) When the master M detects that the signal SRVO assumes the logic "1", it receives the data and changes the logic of the signal RSVRI to "0", so that the provision of both the address and data is stopped. Then the signal BBSY is changed to the logic "0".

FIG. 12 shows an address map defined in the input/output control system (IOC). Note, this address map is basically identical to that shown in previous FIG. 5, however, the address map of FIG. 12 is partially modified with respect to that of FIG. 5, to facilitate an understanding of the example mentioned later. The modifications are as follows. In FIG. 12, the address 4004 and 4005 are shown in more detail to express the IOCTL control register. The address 8001 of FIG. 5 is set up at the address 4001 of FIG. 12. The address "FIFO" of FIG. 5 is set up at the address 4003 of FIG. 12. The above mentioned IOCTL control register will be clarified below, and is composed of a register STR, a register IMCR, and a DFIFO memory. The register STR functions as an IOCTL status register which informs the microprocessor μP of a variety of statuses in the IOCTL. The register ICMR functions as an IOCTL command register. When a command is set in this register, the IOCTL begins an operation instructed by the thus set command. The DFIFO memory is a data FIFO memory which is used to set a command parameter supplementing the related command. Alternatively, the DFIFO memory is used as a small capacity FIFO memory for data transfer, and having a capacity of, for example, 8 bytes.

The input/output unit control circuit IOCTL begins with the following steps.

(1) The command parameter is written in the DFIFO memory, which is necessary for execution of the related command.

(2) The command is written in the ICMR.

(3) A corresponding interruption is generated when the operation, specified by the command, comes to an end.

(4) After detection of the interruption, the content of the STR is read to determine whether the operation has finished normally or abnormally.

It should be noted that, in FIG. 12, the character W denotes that a write operation is possible by the use of a microprogram, and R denotes that a read operation is possible by the use of a microprogram.

When a command is written in the ICMR, the IOCTL operates to read a command parameter from the DFIFO and then starts the related operation. After the commencement of the operation, the IDMACTL is informed of a writing of data to the IOCTL and a reading of data from the IOCTL, by setting a signal DREQ as the logic "1" from the IOCTL. The signal DREQ is the so-called data request signal.

Figure 13A:
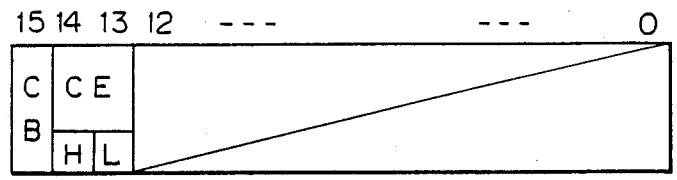
FIG. 13A depicts an example of a bit arrangement for setting up the register (STR)
Figure 13B:
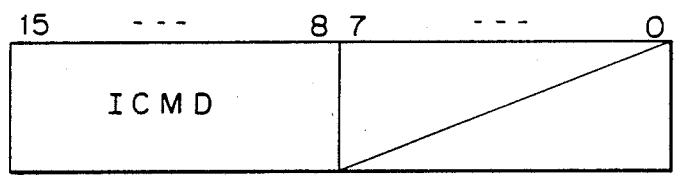
FIG. 13B depicts an example of bit arrangement for setting up the register (ICMR)

FIG. 13A depicts an example of a bit arrangement for setting up the register (STR), and FIG. 13B depicts an example of a bit arrangement for setting up the register (ICMR). Both registers STR and ICMR are set up at the address 4004 in the map of FIG. 12. In FIG. 13A, CB denotes a control circuit busy and both CEH and CEL denote a command end. The bit CB denotes that the IOCTL is executing a command. The bit CB assumes the logic "1" when the command execution starts and is changed to "0" when the command execution is finished. In the command end bits CEH and CEL, the conditions CEH="0" and CEL="0" denote that the command is being executed, and alternatively, no command is issued; the conditions CEH="0" and CEL="1" denote that the operation has finished abnormally; the conditions CEH="1" and CEL="0" denote that the operation has finished normally, and the conditions CEH="1" and CEL="1" denote that the command is invalid. In FIG. 13B, the bits ICMD are used to set an IOCTL command therein.

Figure 14:
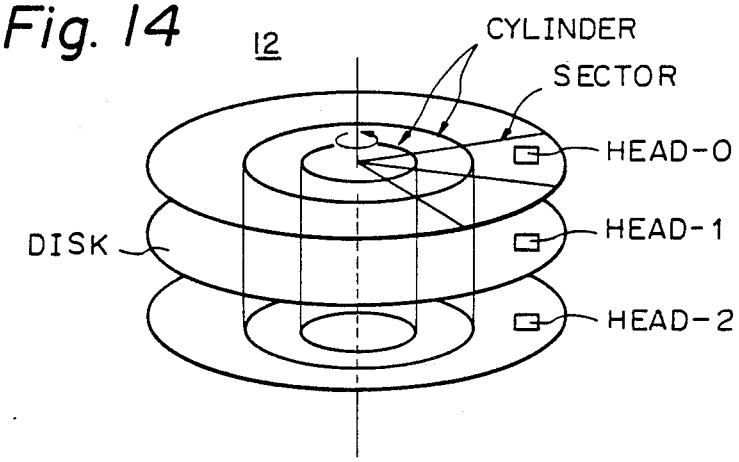
FIG. 14 is a partial perspective view of a magnetic disk unit (DKU)

FIG. 14 is a partial perspective view of the magnetic disk unit (DKU). FIG. 14 is referenced for an explanation of the following table.

TABLE

| COMMAND | OPERATION | COMMAND (hexadecimal notation) | COMMAND PARAMETER |
|---|---|---|---|
| READ DATA | DATA PART OF SPECIFIED SECTOR IS READ | B0 | CN HN |

| COMMAND | OPERATION | COMMAND (hexadecimal notation) | COMMAND PARAMETER |
|---|---|---|---|
| | AND SENT TO HOST. | | SN |
| | | | SCNT |
| WRITE DATA | DATA FROM HOST IS WRITTEN IN SPECIFIED SECTOR. | F0 | CN HN SN SCNT |

The above table displays an example of commands and command parameters. In the table, CN denotes a cylinder number, HN a head number, SN a sector number, and SCNT a number of the sectors.

Figure 15:
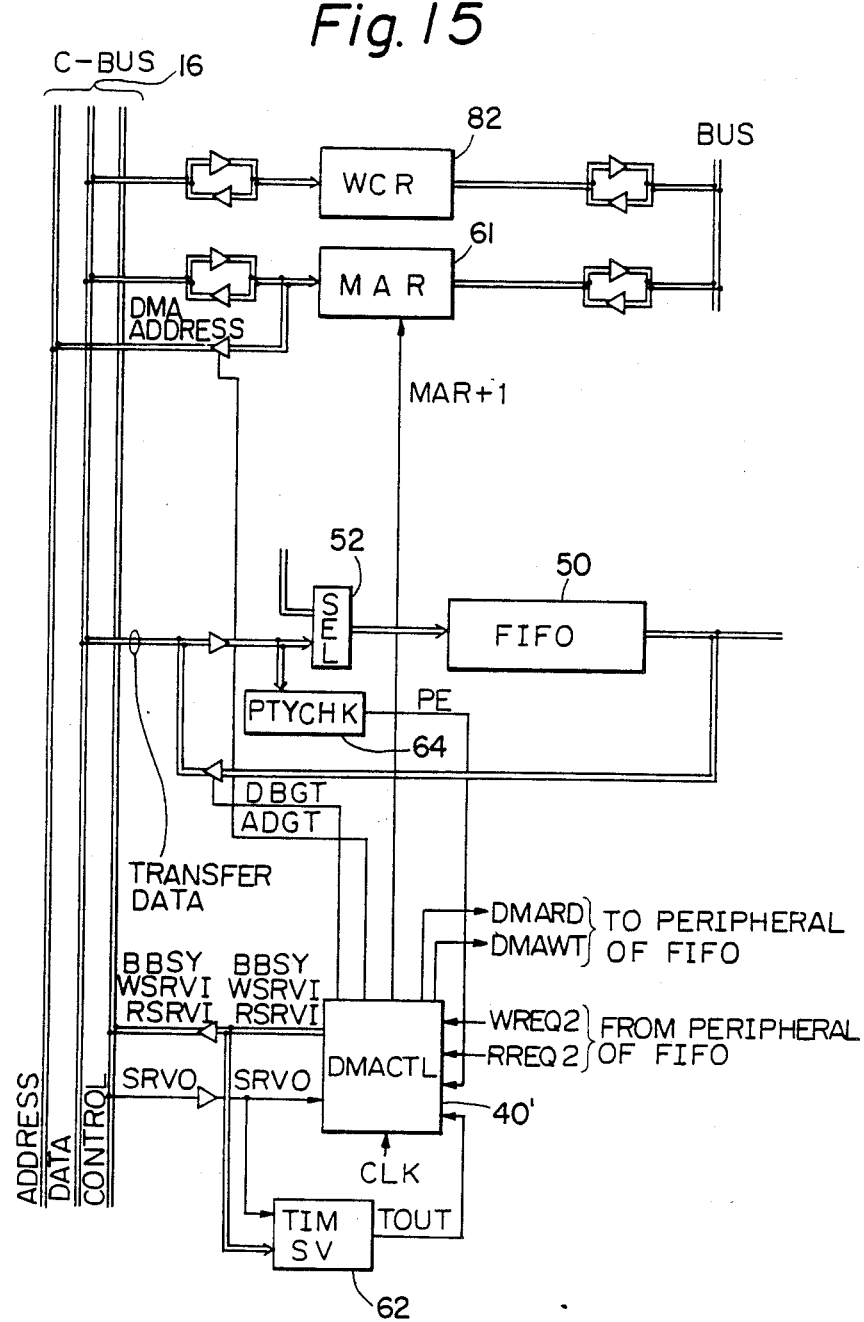
FIG. 15 illustrates a common bus connection area of FIG. 4, in more detail.

FIG. 15 illustrates a common bus connection area of FIG. 4 in more detail. The common bus C-BUS is mainly composed of an address line, a data line, and a control line. Note, members relating to the program mode (PM) are omitted, since FIG. 15 displays members pertinent to the present invention. The DMA transfer between the bus C-BUS and the memory FIFO is started by the signal WREQ2 or RREQ2 (FIG. 10) given from the peripheral of the FIFO memory. When the circuit DMACTL is started by the above mentioned signal, the information transfer, explained in reference to FIGS. 11A and 11B, commences execution. A detailed explanation of the operation concerned will be given hereinafter.

Figures 16, 16A:
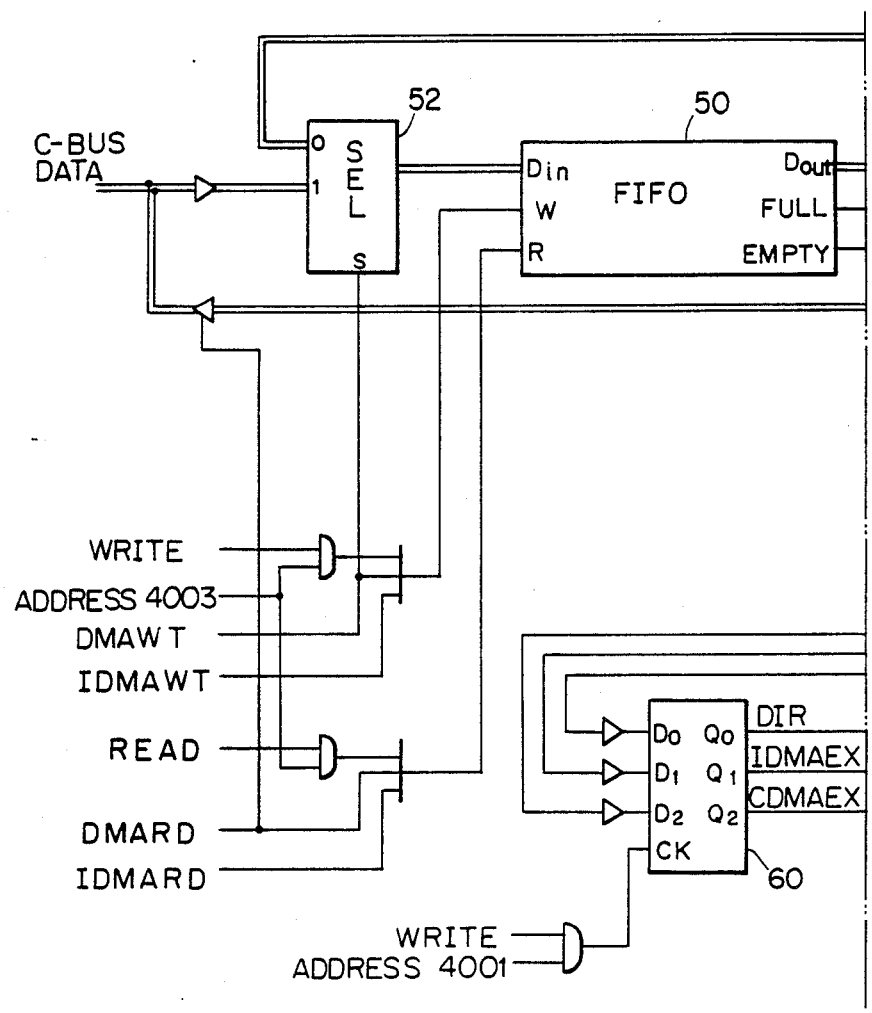
FIGS. 16A and 16B illustrate peripheral circuitry of the memory FIFO.
Figure 16B:
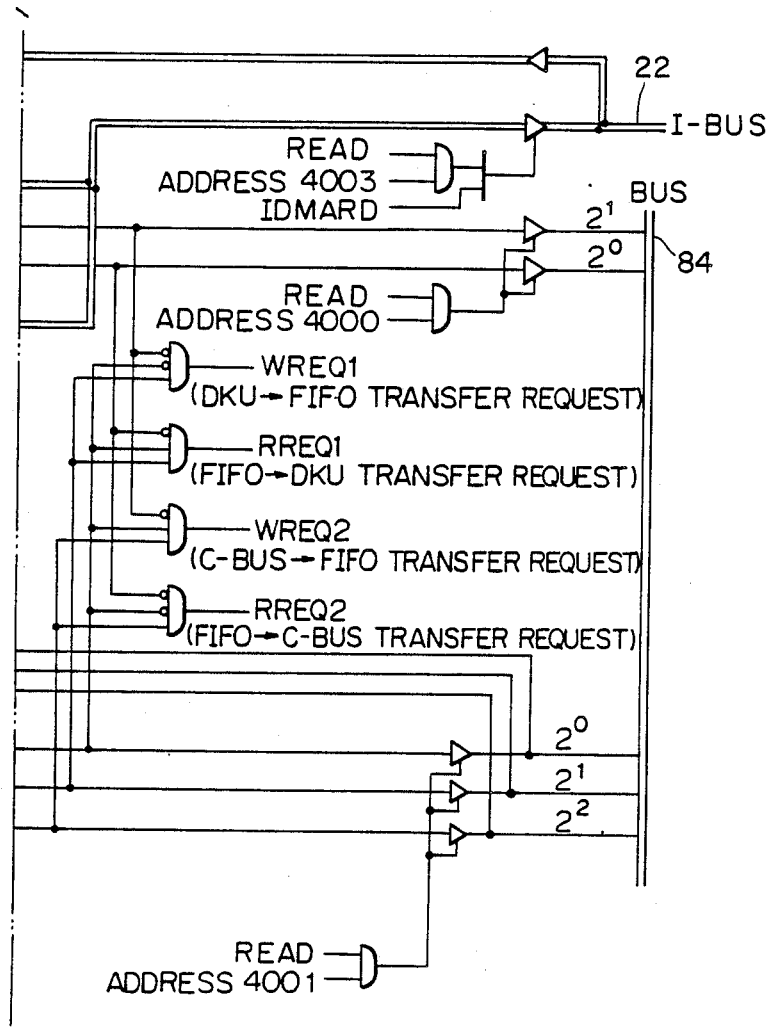

FIGS. 16A and 16B illustrate peripheral circuitry of the FIFO memory. It should be understood that the peripherals of FIGS. 16A and 16B are stored in the control register, relating to the FIFO memory, allotted to the addresses 4000, 4001 and 4003 of the address map shown in FIG. 12. The write/read allocation at the address 4001 is achieved through the microprocessor (μP) bus, illustrated as "BUS" 84 in FIG. 16B. On the other hand, the write/read allocation at the address 4003 is achieved, through the internal bus I-BUS of FIGS. 16A and 16B.

In FIGS. 16A and 16B, the signals "WRITE" and "READ" represent instructions for write and read issued from the microprocessor μP. The address signals indicative of addresses 4000, 4001, and 4003 are formed by decoding the addresses given from the microprocessor μP. Signals DMAWT and DMARD represent instructions for write and read given from the control circuit DMACTL. Signals IDMAWT and IDMARD represent instructions for write and read given from the control circuit IDMACTL. The transfer request signals, i.e., WREQ1, WREQ2, RREQ1, and RREQ2, are selectively generated in accordance with the internal status of the FIFO memory and the content of the control register at the address 4001.

Figure 17:
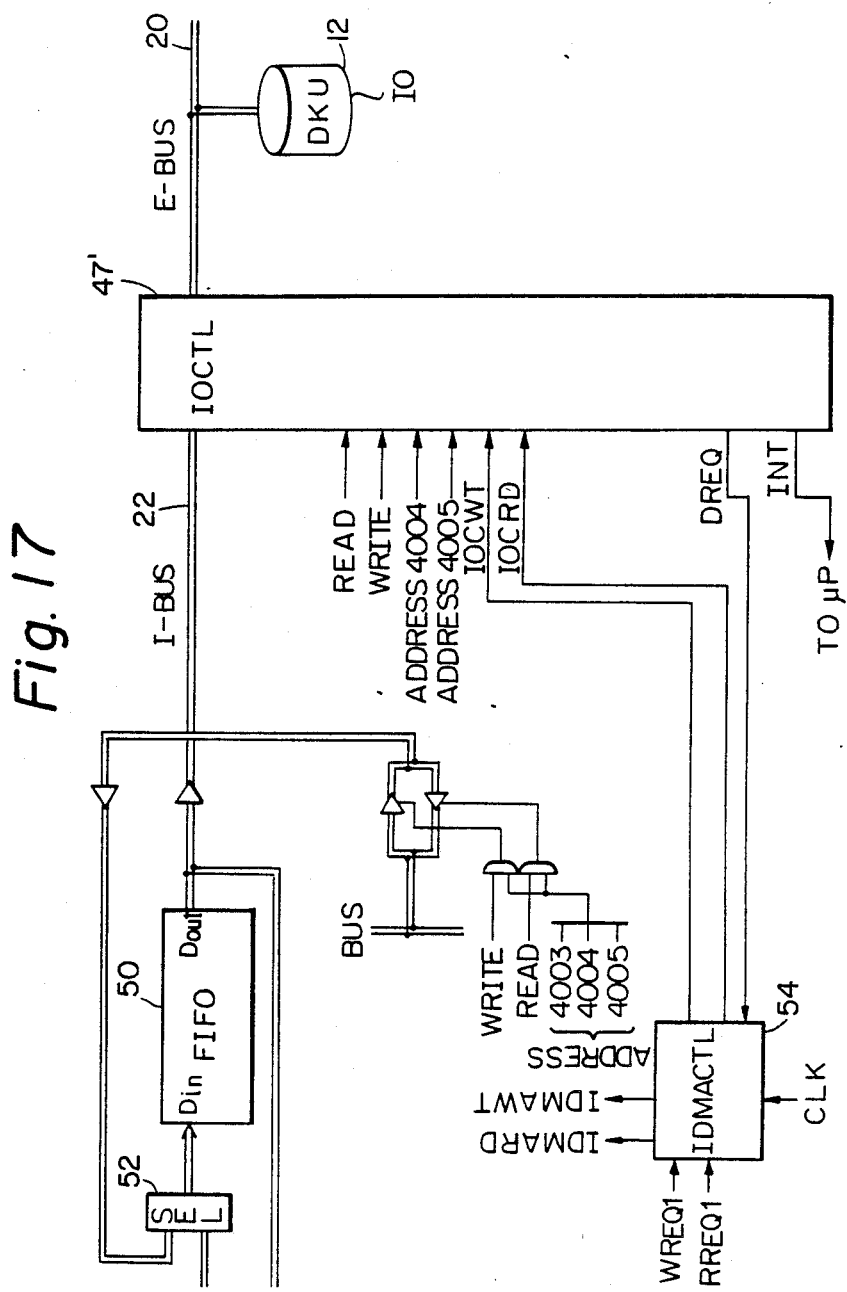
FIG. 17 illustrates peripheral circuitry of the circuit IOCTL.

FIG. 17 illustrates peripheral circuitry of the circuit IOCTL. It should be understood that status of the peripheral circuitry of FIG. 17 is stored in the control register, relating to the circuit IOCTL, allotted to the addresses 4004 and 4005 of the address map shown in FIG. 12. The write/read allocations at the addresses 4004 and 4005 are achieved through the bus I-BUS connected, via a bidirectional driver, to the bus BUS.

In FIG. 17, signals "WRITE" and "READ" represent instructions for write and read issued from the microprocessor μP. The address signals indicative of addresses 4003, 4004, and 4005 are formed by decoding the addresses given from the microprocessor μP. The signals WREQ1 and RREQ1 are transfer requests for starting th circuit IDMACTL, given from the peripheral of the FIFO memory shown in FIG. 16.

The circuit IOCTL is started when the command and the command parameters are written at the addresses 4004 and 4005. The DMA transfer request is generated by starting the IOCTL, so that the IOCTL makes the logic of the bit "DREQ" thereof "1". When the DREQ bit is "1", it is detected that the WREQ1 bit or RREQ1 bit assumes "1", the circuit IDMACTL is started, and a write or read command to the IOCTL is issued as a bit IOCWT or a bit IOCRD. When the transfer is completely finished, the IOCTL issues a bit INT having a logic "1" to raise an interruption to the microprocessor μP.

Figure 18:
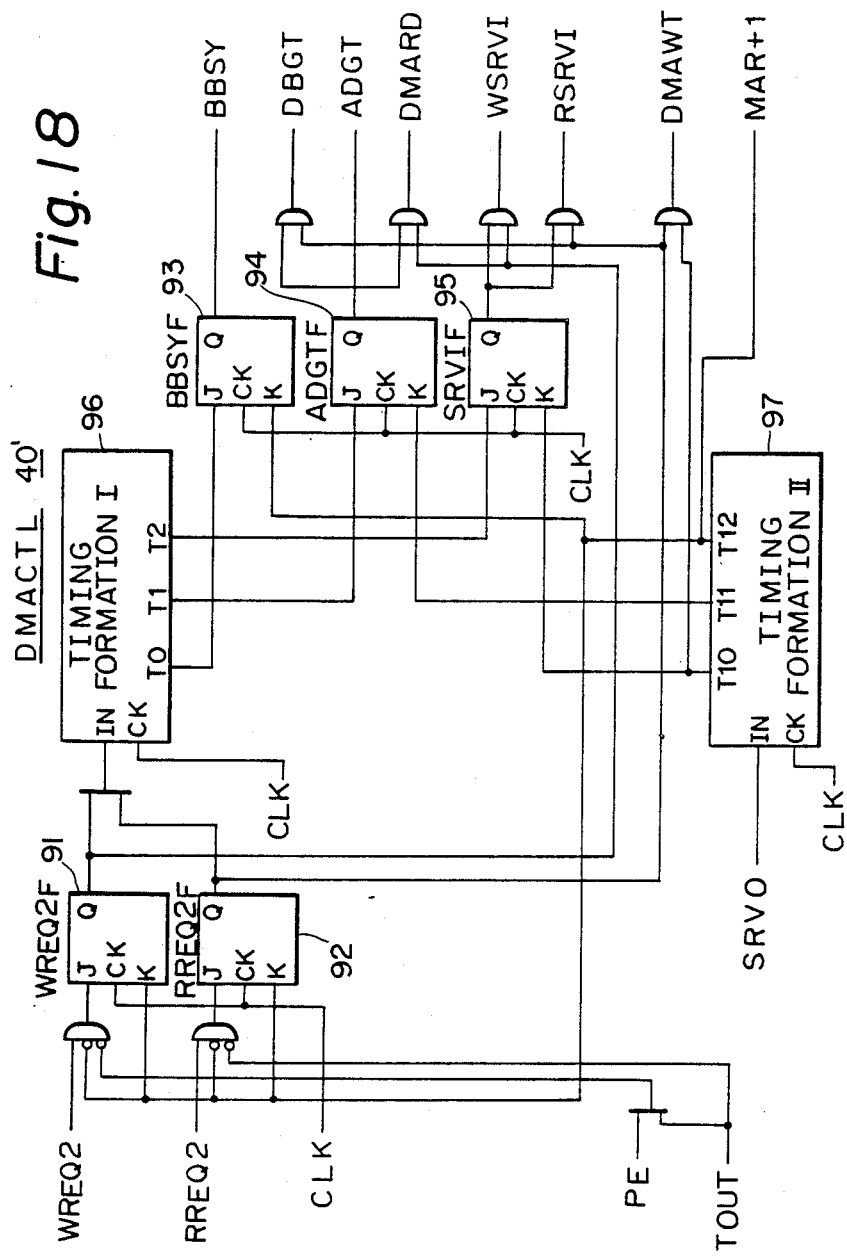
FIG. 18 illustrates a detailed example of the direct memory access mode control circuit (DMACTL)

FIG. 18 illustrates a detailed example of the direct memory access mode control circuit (DMACTL). The circuit DMACTL (FIG. 15) controls a data transfer between the common bus C-BUS and the FIFO memory. In FIG. 18, signals WREQ2 (transfer request from the C-BUS to the FIFO), RREQ2 (transfer request from the FIFO to the C-BUS), RE (C-BUS parity error), TOUT (C-BUS time out), SRVO (service out), BBSY (bus busy), DBGT (data bus gate control), ADGT (address bus gate control), DMARD (read request), WSRVI (write service in), RSRVI (read service in), DMAWT (write request) and MAR+1 (memory address register increment) are all displayed in FIG. 15. In FIG. 18, elements WREQ2F91, RREQ2F92, BBSYF94, ADGTF, and SRVIF95 represent flip-flops in the form of JK-flip-flops. A timing formation circuit I 96 produces three different timing signals at the terminals T0, T1, and T2 thereof, and therefore, the circuit I can be made of, for example, D-flip-flops connected in tandem and operated in synchronism with a clock CLK. This is also true for a timing formation circuit II 97. The operation of the circuit shown in FIG. 18 will be clarified with reference to FIGS. 19 and 20.

FIG. 19 depicts timing charts for explaining the operation of the circuit DMACTL under the DMA write mode, i.e., C-BUS→DKU, and FIG. 20 depicts timing charts for explaining the operation of the circuit DMACTL under the DMA read mode, i.e., DKU→C-BUS.

Figure 21:
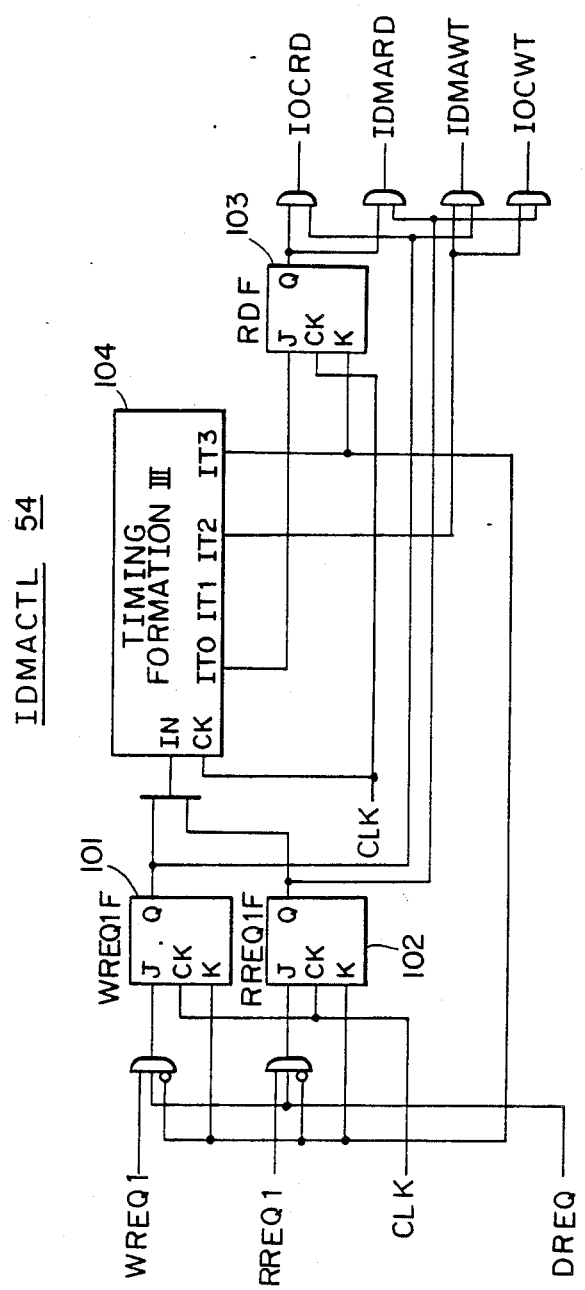
FIG. 21 illustrates a detailed example of the input/output unit direct memory access mode control circuit (IDMACTL)

FIG. 21 illustrates a detailed example of the input/output unit direct memory access mode control circuit (IDMACTL). The control circuit IDMACTL (FIG. 17) controls data transfer between the FIFO memory and the input/output unit control circuit (IOCTL). In FIG. 21, signals WREQ1 (transfer request from the DKU to the FIFO memory), RREQ1 (transfer request from the FIFO memory to the DKU), DREQ (DMA transfer request), IOCRD (read request to the IOCTL), IDMARD (read request to the gate G33 (FIG. 10)), IDMAWT (write request to the gate G32 (FIG. 10), IOCWT (write request to the IOCTL) are all displayed in FIG. 17. In FIG. 21, elements WREQ1F101, RREQ1F102, and RDF103 represents flip-flops, in the form of JK-flip-flops. A timing formation circuit III 104 produces four different timing signals at the terminals IT0, IT1, IT2 and IT3 thereof, and therefore, the circuit III can be made of, for example, D-flip-flops connected in tandem and operated in synchronism with the clock CLK. The operation of the circuit shown in FIG. 21 will be clarified with reference to FIGS. 22 and 23.

Figure 22:
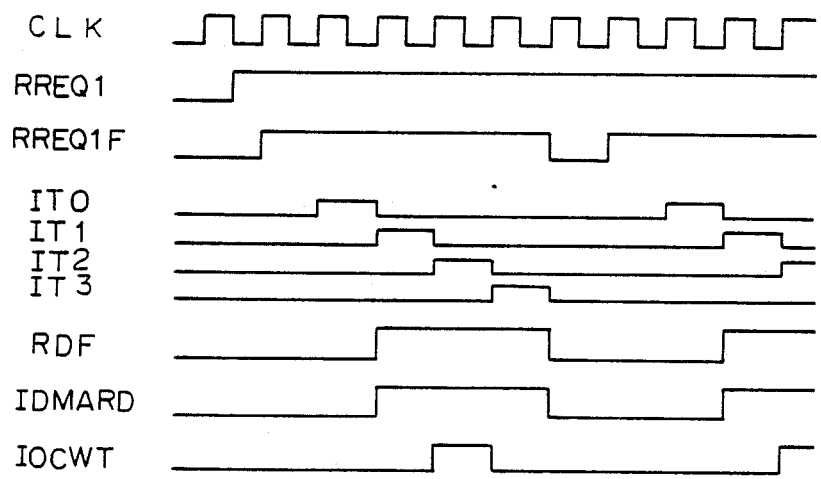
FIG. 22 depicts timing charts for explaining the operation of the circuit IDMACTL under the DMA read mode, i.e., DKU→FIFO.
Figure 23:
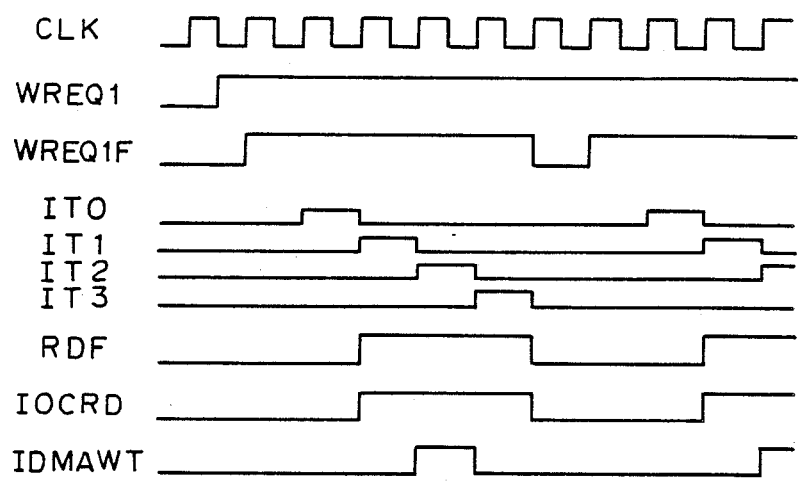
FIG. 23 depicts timing charts for explaining the operation of the circuit DMACTL under the DMA write mode, i.e., FIFO→DKU.

FIG. 22 depicts timing charts for explaining the operation of the circuit IDMACTL under the DMA read mode, i.e., DKU→FIFO, and FIG. 23 depicts timing charts for explaining the operation of the circuit DMACTL under the DMA write mode, i.e., FIFO→DKU. Thus, the circuit IDMCTL is started when the following conditions are satisfied; first, either WREQ1 or RREQ1 assumes the logic "1", and second, the transfer request DREQ from the IOCTL assumes the logic "1".

Figure 24:
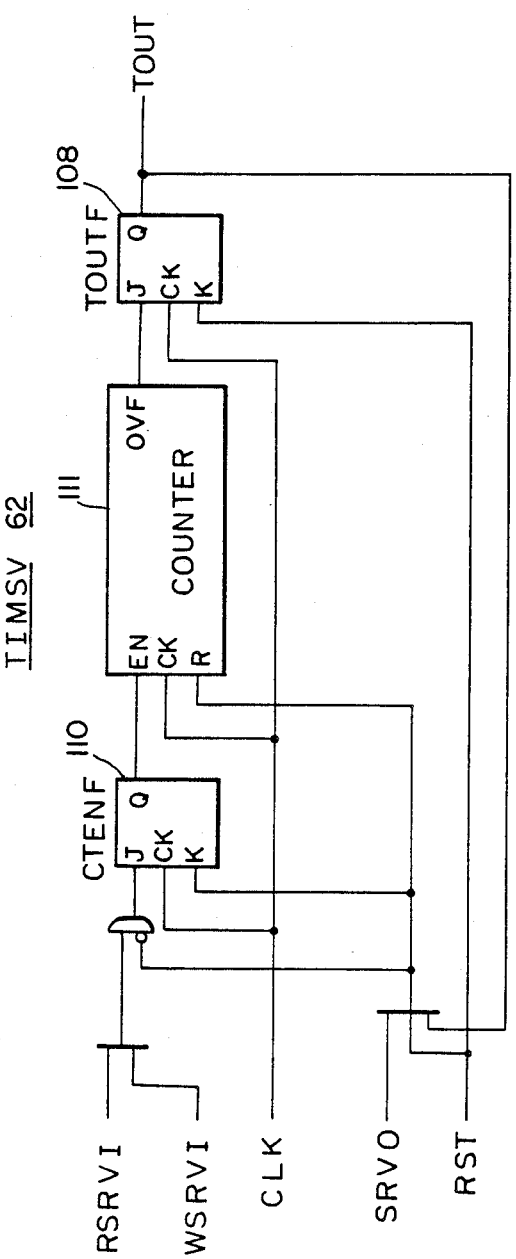
FIG. 24 illustrates a detailed example of the time supervisor TIMSV. The supervisor (FIG. 15) detects the C-BUS time out and produces the corresponding C-BUS time out signal TOUT.

FIG. 24 illustrates a detailed example of the time supervisor TIMSV. The supervisor (FIG. 15) detects the C-BUS time out and produces the corresponding C-BUS time out signal TOUT. That is, the supervisor TIMSV determines whether or not the time from the issuance of WSRVI to the reception SRVO is shorter than the prescribed time. During the case where the time out flip-flop TOUTF 108 is not set, a signal RSRVI or WSRVO (refer to FIGS. 11A and 11B) is received. Under such a condition, if the signal SRVO is "1", a counter enable flip-flop CTENF 110 is set and a counter 111 continues counting incrementally so long as the flip-flop CTENF is set. If the signal SRVO changes to logic "1" before an overflow (OVF) of the counter, the flip-flop CTENF is reset. Therefore, the counter is also reset, and thus the flip-flop TOUTF cannot be set.

If the counter overflows before the change of the SRVO to "1", the flip-flop TOUTF is set, and both the flip-flop CTENF and the counter are reset. This means that the C-BUS time out is detected. Accordingly, the C-BUS time out detection time is defined with the time up to the overflow of the counter. The operation of the circuit shown in FIG. 24 will be further clarified with reference to FIG. 25.

Figure 25:
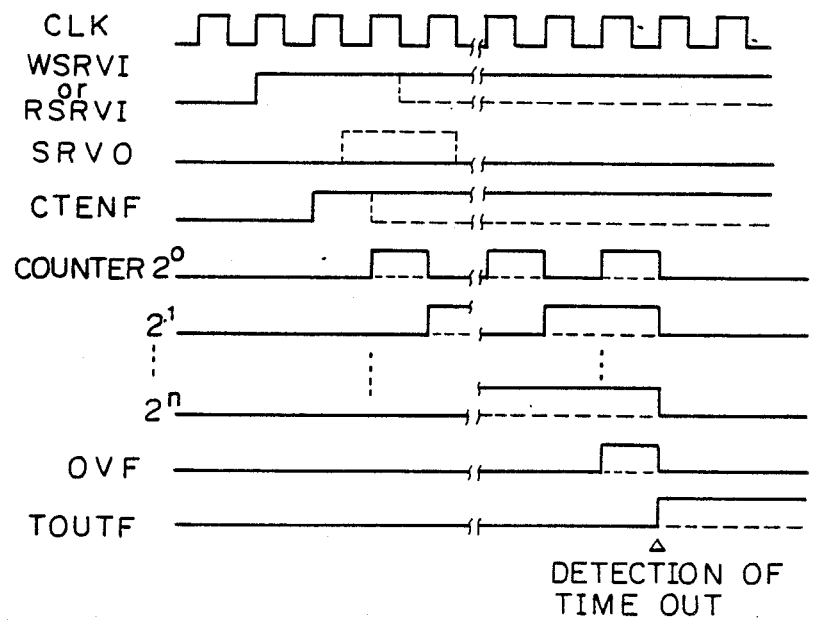
FIG. 25 depicts timing charts for explaining the operation of the time supervisor (TIMSV) illustrated in FIG. 24.

FIG. 25 depicts timing charts for clarifying the operation of the time supervisor (TIMSV) illustrated in FIG. 24. In FIG. 25, the triangle symbol at the bottom thereof represents the time at which the time out concerned is detected. Further, the dotted lines represent the case where the C-BUS operation is performed normally.

Figure 26:
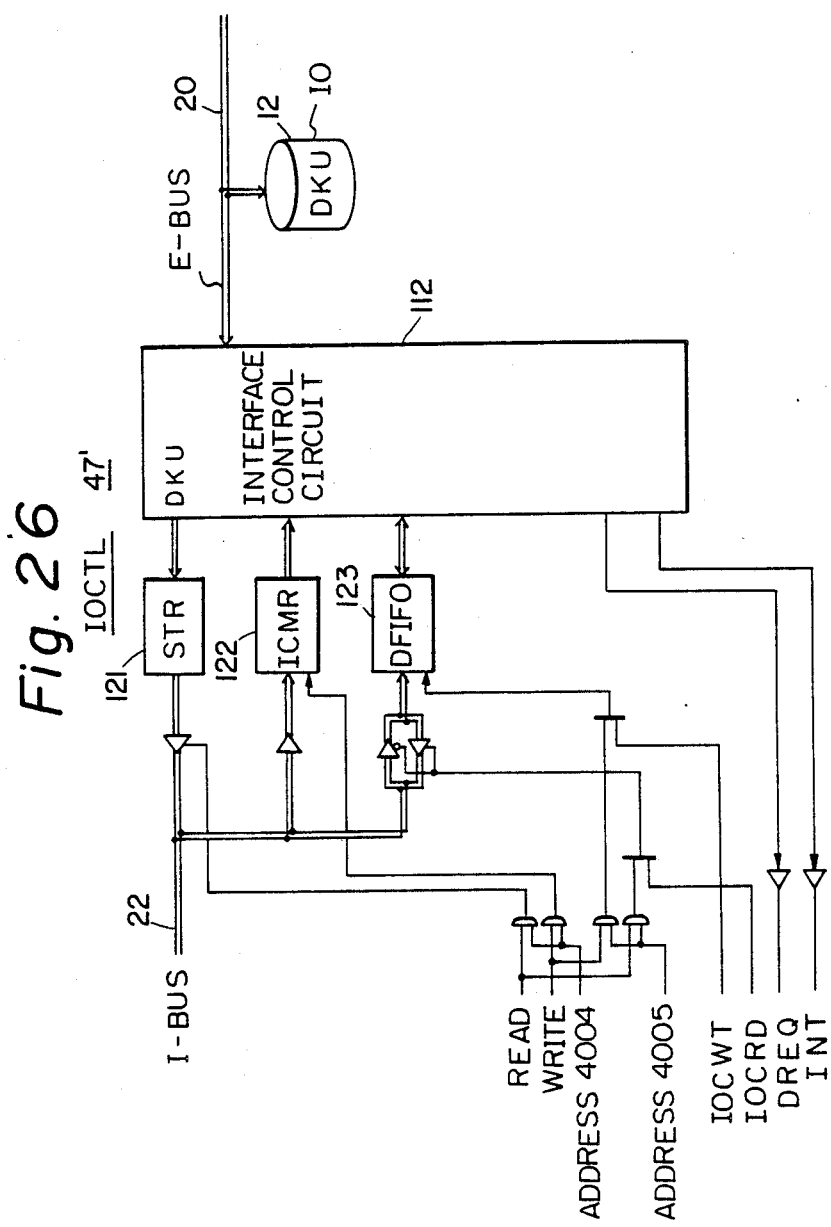
FIG. 26 illustrates a detailed example of the input/output control circuit (IOCTL).

FIG. 26 illustrates a detailed example of the input-/output control circuit (IOCTL). It should be understood that the IOCTL of FIG. 26 is set up for, among a variety of input/output units, the magnetic disk unit DKU. Therefore, the unit DKU is controlled by the IOCTL by way of a usual DKU interface control circuit 112, which is not pertinent to the present invention, and therefore, no further explanation will be given therefor. The members shown in this figure are already mentioned in reference to the previous figures. For example. "STR" 121, "ICMR" 122 and "DFIFO" 123 are shown in FIG. 12, and the "READ", "WRITE", "INT", "DREQ" "IOCWT", and "IOCRD" are shown in FIG. 17.

As mentioned above in detail, in the present invention, although the IOC system is operated under a low cost one-chip microprocessor which is easy to use but has a low in operation speed, the IOC system can substantially act as a high speed operation system due to the use of the hardware concerned. In this case, it becomes difficult, in general, to establish a satisfactory diagnostic check due to employment of such hardware. This problem, however, can be overcome with the use of the diagnostic check portion and thus, a prompt restoration from a malfunction state is assured. This attributes to the realization of a highly reliable IOC system.

What is claimed is:

1. An input/output control system connected, via a common bus to a central control unit and, via an external bus to an input/output unit, for controlling transfer of data between the central control unit and the input-/output unit, said input/output control system comprising:

a buffer memory, connected to the common bus, for momentarily storing transfer data and for outputting full and empty signals indicating full and empty states thereof;

a control register, connected to the common bus, for storing sets of data transfer control information from the central control unit, the data transfer control information including a number of words to be transferred, and for outputting a zero words signal when the number of words to be transferred is zero;

a microprocessor, connected to the common bus via said control register, for generating commands for initiating and completing data transfer under control of a microprogram;

an input/output unit control circuit, connected to the common and external buses, said buffer memory and said microprocessor, for controlling the input-/output unit, only starting and finishing operations of said input/output unit control circuit being controlled by execution of the microprogram in said microprocessor;

direct memory access control means for controlling data transfer using said buffer memory in dependence upon the data transfer control information written in said control register, said direct memory access control means comprising:

an input/output unit direct memory access control circuit connected to said input/output unit control circuit and said buffer memory, for controlling data transfer between said buffer memory and said input/output unit control circuit, using the read and write commands from said microprocessor only for controlling initiation and completion of data transfer; and a direct memory access control circuit connected to the common bus and said buffer memory, for controlling data transfer between said buffer memory and the common bus using the read and write commands only for controlling initiation and completion of data transfer; and logic means for generating a first control signal, in dependence upon the full and empty signals, to control generation of the read and write commands by said input/output unit direct memory access control circuit and for generating a second control signal, in dependence upon the full and empty signals and the zero words signal, to control generation of the read and write commands by said direct memory access control circuit, the read and write commands controlling operation of the buffer memory.

2. An input/output control system connected, via a common bus to a central control unit and, via an external bus to an input/output unit, for controlling transfer of data between the central control unit and the input-/output unit, said input/output control system comprising:
- a buffer memory, connected to the common bus, for momentarily storing transfer data;
- a control register, connected to the common bus, for storing sets of data transfer control information from the central control unit;
- a microprocessor, connected to the common bus via said control register, for generating commands for initiating and completing data transfer under control of a microprogram;
- an input/output unit control circuit, connected to the common and external buses, said buffer memory and said microprocessor, for controlling the input-/output unit, only starting and finishing operations of said input/output unit control circuit being controlled by execution of the microprogram in said microprocessor, said input/output unit control circuit issuing an interruption for finish signal to deactivate said microprocessor in response to the data transfer coming to an end
- direct memory access control means, connected to the common bus, for controlling data transfer using said buffer memory in dependence upon the data transfer control information written in said control register and, for initiation and completion of data transfer only, the commands from said microprocessor, said direct memory access control means comprising:
  - an input/output unit direct memory access control circuit connected to said input/output unit control circuit and said buffer memory, for controlling data transfer between said buffer memory and said input/output unit control circuit; and
  - a direct memory access control circuit connected to the common bus and said buffer memory, for
  - controlling data transfer between said buffer memory and the common bus; and
- a program mode control circuit connected between the common bus and said microprocessor, for controlling data transfer under a program mode, said program mode control circuit issuing an interruption for activation signal to activate said microprocessor in response to a data transfer request from the central control circuit.

3. A system as set forth in claim 2, wherein said buffer memory comprises a first in/first-out memory.

4. A system as set forth in claim 3, wherein said first-in/first-out memory comprises:
- an input terminal connected to the common bus and said input/output control circuit, for receiving write data;
- an output terminal, connected to the common bus and said input/output control circuit, for outputting read data;
- a write mode command reception terminal, connected to said direct memory access control circuit and said input/output unit direct memory access control circuit, for receiving write commands;
- a read mode command reception terminal, connected to said direct memory access control circuit and said input/output unit direct memory access control circuit, for receiving read commands;
- a full terminal, connected to said direct memory access control circuit and said input/output unit direct memory access control circuit, for providing an indication that said first-in/first-out memory is full of the transfer data; and
- an empty terminal for providing an indication that said first-in/first-out memory is empty of the transfer data, and wherein said input/output unit control circuit comprises:
- a write mode command reception terminal, connected to said input/output unit direct memory access control circuit, for receiving a write command, said input/output control circuit starting the input/output unit upon receiving the write command in a write mode; and
- a read mode command reception terminal, connected to said input/output unit direct memory access control circuit, for receiving a read command, said input/output control circuit starting the input/output unit upon receiving the read command in a read mode.

5. A system as set forth in claim 4,
wherein said input/output unit direct memory access control circuit comprises a control terminal for receiving a first control signal, said input/output unit direct memory access control circuit producing in response to the first control signal a first access signal supplied to one of the write and read mode command reception terminals of said first-in/first-out memory and a second access signal supplied to one of the write and read mode command reception terminals of said input/output unit control circuit, and
wherein said input/output control system further comprises a first logic gate having inputs connected to the full and empty terminals of said first-in/first-out memory and an output, connected to input/output unit direct memory access control circuit, for supplying the first control signal.

6. A system as set forth in claim 5,
wherein said direct memory access control circuit supplies a third access signal to the write and read mode command reception terminals of said first-in/first-out memory in response to a second control signal, and
wherein said input/output control system further comprises a second logic gate having an output connected to said direct memory access control circuit to supply the second control signal and inputs connected to the full and empty terminals of said first-in/first-out memory and to said control register to receive an information signal indicative of a number of transfer words reaching zero, the number of transfer words specified by one of the sets of data transfer control information stored in said control register.

7. A system as set forth in claim 6, wherein said the first-in/first-out memory selectively transfers data from the common bus to the input/output unit in the write mode and from the input/output unit to the common bus in the read mode.

8. A system as set forth in claim 7, wherein the inputs of said first logic gate and said second logic gate are further connected to receive said control register to transfer direction specifying information specifying operation of said input/output unit direct memory access control circuit and said direct memory access control circuit under the write mode and the read mode, selectively, the transfer direction specifying information being stored in one of the sets of data transfer control information in said control register.

9. A system as set forth in claim 8,
further comprising a time supervisor, connected to said second logic gate and the common bus, for detecting a common bus time out representing a condition that no response is returned, after elapse of a predetermined time period, from the central control unit in response to a third control signal, and
wherein said direct memory access control circuit outputs the third control signal on the common bus.

10. A system as set forth in claim 9, wherein the input of said second logic gate are further connected to receive a parity check part indicating whether a parity error exists in the transfer data provided on the common bus (C-BUS).

11. A system as set forth in claim 7, further comprising a selector, connected to the common bus, the input terminal of said first-in/first-out memory, said input/output unit control circuit and said input/output unit direct memory access control circuit, for selecting between the transfer data from the common bus and the transfer data from the input/output unit are for storage in said first-in/first-out memory under the control of said input/output unit direct memory access control circuit.

12. A system as set forth in claim 8,
wherein a main memory is connected to the common bus, and
wherein said direct memory access mode control circuit generates an increment signal to increment main memory address information by one every time the transfer data is supplied via the common bus to the main memory, the main memory address information being stored in one of the sets of data transfer control information in said control register and indicating an address of the main memory where the transfer data is to be written.

13. A system as set forth in claim 4, further comprising a diagnostic check circuit, connected to said first-in/first-out memory, said direct memory access control circuit, and said input/output unit direct memory access control circuit, for selectively executing a diagnostic operation with regard to said first-in/first-out memory, the input/output unit and said microprocessor.

14. A system as set forth in claim 13, wherein said diagnostic check circuit controls said input/output unit direct access control circuit and said direct memory access mode circuit to momentarily stop issuance of write commands and read commands from at least one of said input/output unit direct access control circuit and said direct memory access mode circuit during diagnostic operations.

15. The system as set forth in claim 14, wherein said diagnostic check circuit issues one of a write command and a read command to said first-in/first-out memory under control of the microprogram executed by said microprocessor.

16. The system as set forth in claim 15, wherein said diagnostic check circuit selectively sets up, at least, a first diagnostic mode, a second diagnostic mode and a third diagnostic mode, in which, under the first diagnostic mode, diagnostic check data is communicated only between said microprocessor and said first-in/first-out memory, under the second diagnostic mode, the diagnostic check data is communicated only between said microprocessor, said first-in/first-out memory and the input/output unit, and under the third diagnostic mode, the diagnostic check data is communicated only between said microprocessor, said first-in/first-out memory and the central control unit.

17. A system as set forth in claim 16, wherein said diagnostic check circuit comprises logic gates connected to receive at least for sets of information: transfer direction specifying information generated by said microprocessor under control of the microprogram, information indicative of activation of said input/output unit direct memory access control circuit, information indicative of activation of said direct memory access control circuit, and status information indicating full and empty status of said first-in/first-out memory, said logic gates outputting first read and write requests to said input/output unit direct memory access control circuit and read and write requests to said direct memory access control circuit.

18. A system as set forth in claim 17, wherein said diagnostic check circuit detects that no problem has occurred in said first-in/first-out memory in the first diagnostic mode, in said first-in/first-out memory and the input/output unit in the second diagnostic mode and in said first-in/first-out memory and said microprocessor in the third diagnostic mode.

19. A system as set forth in claim 16, wherein said diagnostic check circuit is further selectively sets up a fourth mode in which the transfer data in said first-in/first-out memory is processed to form processed transfer data using said microprocessor and the processed transfer data is rewritten in said first-in/first-out memory, the processed transfer data thereafter bring stored in the input/output unit.

20. A system as set forth in claim 19, wherein said microprocessor produces the processed transfer data in the fourth mode by executing a cipher process on the transfer data.

21. A system as set forth in claim 4,
further comprising a first logic gate having a first input connected to the full terminal of said first-in/first-out memory and a second input connected to the empty terminal of said first in/first-out memory and having an output providing a first control signal to said input/output unit direct memory access control circuit, and
wherein said input/output unit direct memory access control circuit, in response to the first control signal from said first logic gate, provides one of a write command to the write mode command reception terminals of said first-in/first-out memory and said input/output unit control circuit and a read command to the read mode command reception terminals of said first-in/first-out memory and said input/output unit control circuit.

22. A system as set forth in claim 21,
wherein the sets of data transfer control information stored in said control register includes a number of words of data to be transferred,
wherein said input/output control system further comprises a second logic gate having a first input connected to the full terminal of said first-in/first-out memory, a second input operatively connected to the empty terminal of said first-in/first-out memory and a third input operatively connected to said control register to receive an information signal indicating that the number of words of data to be transferred is zero and moving an output providing a second control signal to said direct memory access control circuit, and wherein said direct memory access control circuit, in response to the second control signal from said second logic data, provides one or a write command to the write mode command reception terminal of said first-in/first-out memory and a read command to the read mode command reception terminal of said first-in/first-out memory.

23. A system as set forth in claim 16, wherein said diagnostic check circuit has a fourth mode, the transfer data in said first-in/first-out memory being processed by said diagnostic check circuit in the fourth mode to produce processed transfer data, the processed transfer data being stored in said first-in/first-out memory and thereafter transferred to the input/output unit.

* * * * *

UNITED STATES PATENT AND TRADEMARK OFFICE
CERTIFICATE OF CORRECTION

PATENT NO. : 4,933,840

DATED : June 12, 1990

INVENTOR(S) : Sera et al.

It is certified that error appears in the above-identified patent and that said Letters Patent is hereby corrected as shown below:

Col. 3,      line 46, "I-BUS 30," should be --I-BUS 22,--.

Col. 5,      line 55, "mo" should be --mode--.

Col. 6,      line 35, "DMACTL." should be --DMACTL 40.--.

Col. 7,      line 46, "agnostic" should be --a diagnostic--;
               line 48, "fr" should be --from the--;
               line 56, "a" should be deleted.

Col. 11,      line 31, "DIR·F/F" should be --DIR·F/F 60--.

Col. 16,      line 18, "Din" should be --$D_{in}$,--;
               line 19, ",is" should be --is--.

Col. 22,      line 3, "IMCR" should be --ICMR--.

UNITED STATES PATENT AND TRADEMARK OFFICE
CERTIFICATE OF CORRECTION

PATENT NO. : 4,933,840

DATED : June 12, 1990

INVENTOR(S) : Sera et al.

It is certified that error appears in the above-identified patent and that said Letters Patent is hereby corrected as shown below:

Col. 24, line 12, "th" should be --the--;

line 39, "WREQ2F91, RREQ2F92," should be --WREQ2F 91, RREQ2F 92,--;

line 40, "BBSYF94, ADGTF, and SRVIF95" should be --BBSYF 93, ADGTF 94, and SRVIF 95--.

Col. 29, line 25, "are" should be deleted.

Col. 30, line 8, "for" should be --four--;

line 33, "bring" should be --being--.

Signed and Sealed this

Fifteenth Day of December, 1992

Attest:

DOUGLAS B. COMER

Attesting Officer

Acting Commissioner of Patents and Trademarks